United States Patent
Spence et al.

(10) Patent No.: US 7,860,134 B2
(45) Date of Patent: Dec. 28, 2010

(54) SIGNAL SEPARATION

(75) Inventors: Geoffrey Spence, Malvern (GB); Ira James Clarke, Malvern (GB)

(73) Assignee: Qinetiq Limited (GB)

( * ) Notice: Subject to any disclaimer, the term of this patent is extended or adjusted under 35 U.S.C. 154(b) by 1365 days.

(21) Appl. No.: 10/538,947

(22) PCT Filed: Dec. 4, 2003

(86) PCT No.: PCT/GB03/05285
§ 371 (c)(1),
(2), (4) Date: Jun. 14, 2005

(87) PCT Pub. No.: WO2004/055718
PCT Pub. Date: Jul. 1, 2004

(65) Prior Publication Data
US 2006/0153059 A1 Jul. 13, 2006

(30) Foreign Application Priority Data
Dec. 18, 2002 (GB) .................................. 0229473.4

(51) Int. Cl.
*H04J 3/04* (2006.01)
(52) U.S. Cl. ........................................ 370/536; 706/20
(58) Field of Classification Search ......... 370/241–252, 370/537, 538, 535, 536; 600/323, 324, 500–502, 600/300, 325, 326; 706/20, 22, 25
See application file for complete search history.

(56) References Cited
U.S. PATENT DOCUMENTS

| | | | | |
|---|---|---|---|---|
| 5,706,402 A | * | 1/1998 | Bell | .............. 706/22 |
| 5,959,966 A | * | 9/1999 | Torkkola | ..................... 370/203 |
| 6,262,943 B1 | * | 7/2001 | Clarke | ......................... 367/135 |
| 6,701,170 B2 | * | 3/2004 | Stetson | ........................ 600/323 |
| 6,799,170 B2 | * | 9/2004 | Lee et al. | ...................... 706/20 |
| 6,936,012 B2 | * | 8/2005 | Wells | ............................ 600/554 |

FOREIGN PATENT DOCUMENTS
DE 4228900 3/1994

OTHER PUBLICATIONS

Kanjilal et al., "On Multiple Pattern Extraction Using Singular Value Decomposition", IEEE pp. 1536-1540 (1995).
Cardoso, "Blind Signal Separation: Statistical Principles", Proceedings of the IEEE, pp. 2009-2025 (1998).
Freire et al., "Application of Singular Value Decomposition to Vertical Seismic Profiling", Geophysics, pp. 778-785 (1988).

(Continued)

*Primary Examiner*—Huy D Vu
*Assistant Examiner*—Dady Chery
(74) *Attorney, Agent, or Firm*—McDonnell Boehnen Hulbert & Berghoff LLP

(57) ABSTRACT

A signal separation method for separation of source signals from a composite signal expresses the composite signal as a series of values of signal amplitude. The source signals have periodicities similar or equal to p. The composite signal is portioned into sections which provide respective rows of a matrix X, in which successive rows represent successive sections. A singular value decomposition of the matrix X is performed to obtain two singular vector matrices U, V and a singular value matrix $\lambda$. An independent component analysis is performed on one of the singular vector matrices U, V to obtain an independent component matrix $UR_2^T, R_1^T V$ and an associated component matrix $R_2 \lambda V, U \lambda R_1$. One of the component matrices $UR_2^T, U \lambda R_1$ contains estimated separated signal modulation envelopes and the other component matrix $R2 \lambda V, R_1^T V$ contains estimated separated cyclets.

17 Claims, 17 Drawing Sheets

OTHER PUBLICATIONS

Vrabie et al., "Modified Singular Value Decomposition by Means of Independent Component Analysis", Elsevier Science, pp. 645-652 (2004).

Mars et al., "Extensions de la SVD aux donnees multidimensionnelles: Application a la separation de sources", 19E Colloque Sur Le Traitement Du Singal Et Des Images Gretsi, pp. 1-4 (2003).

* cited by examiner

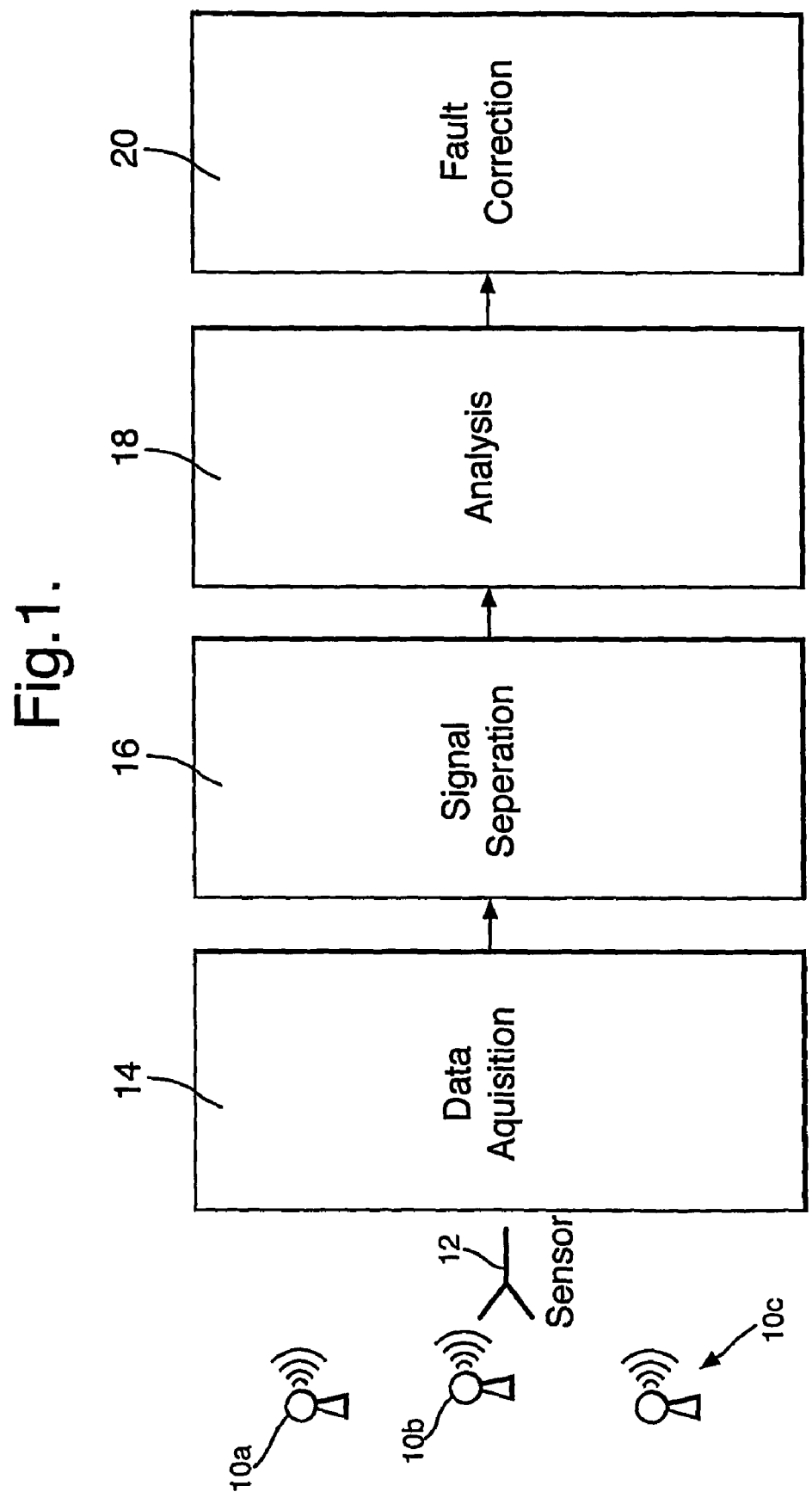

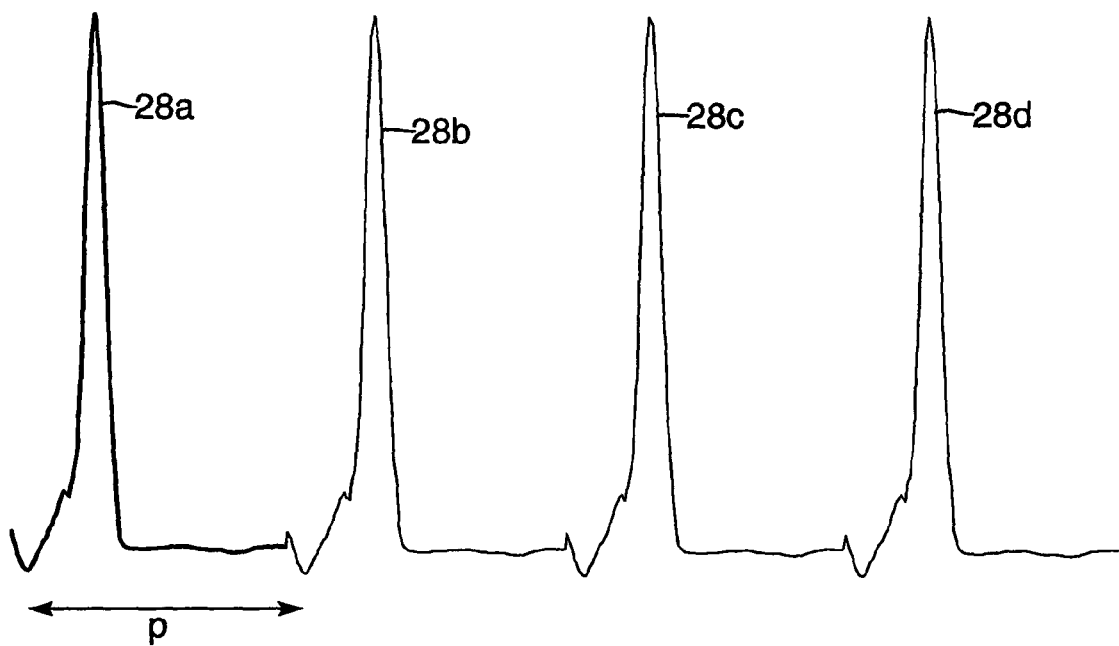

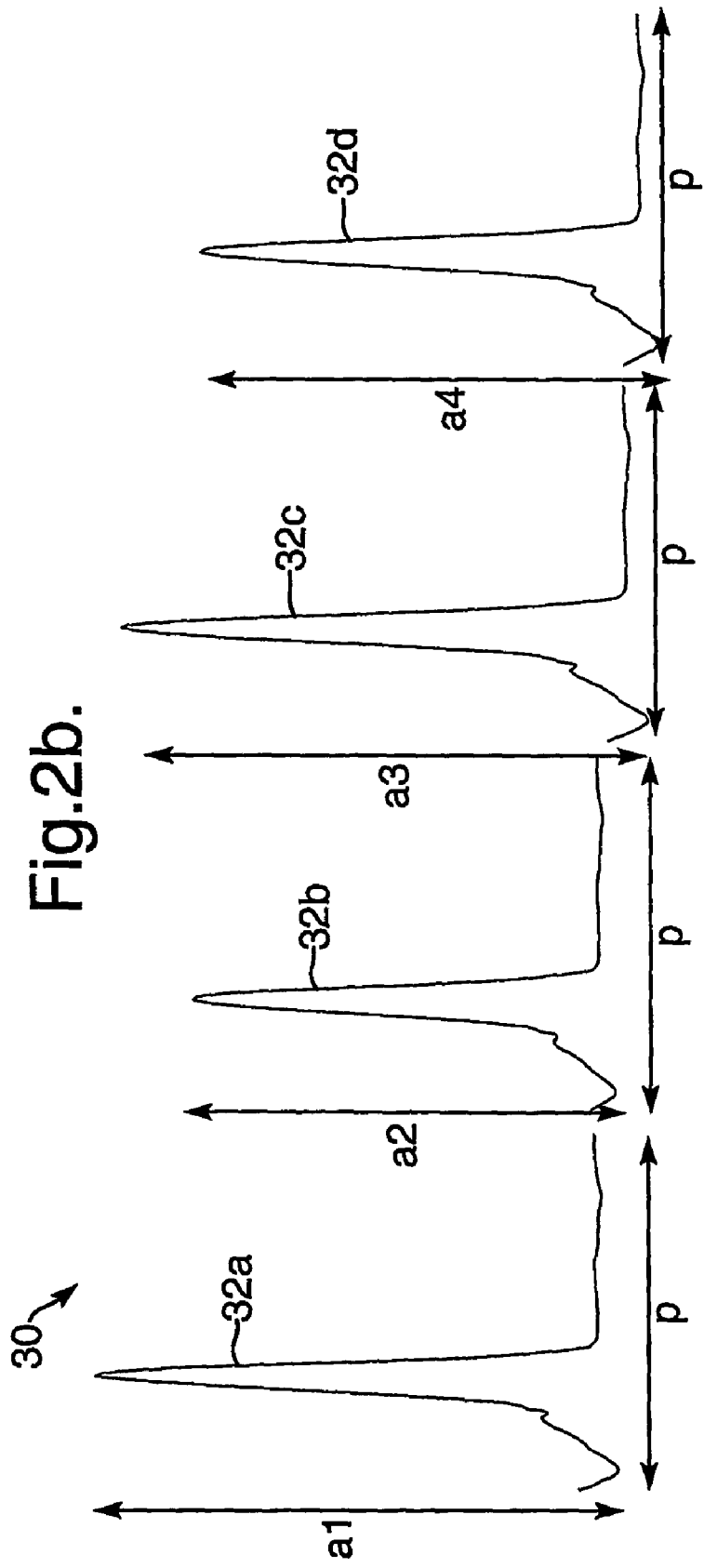

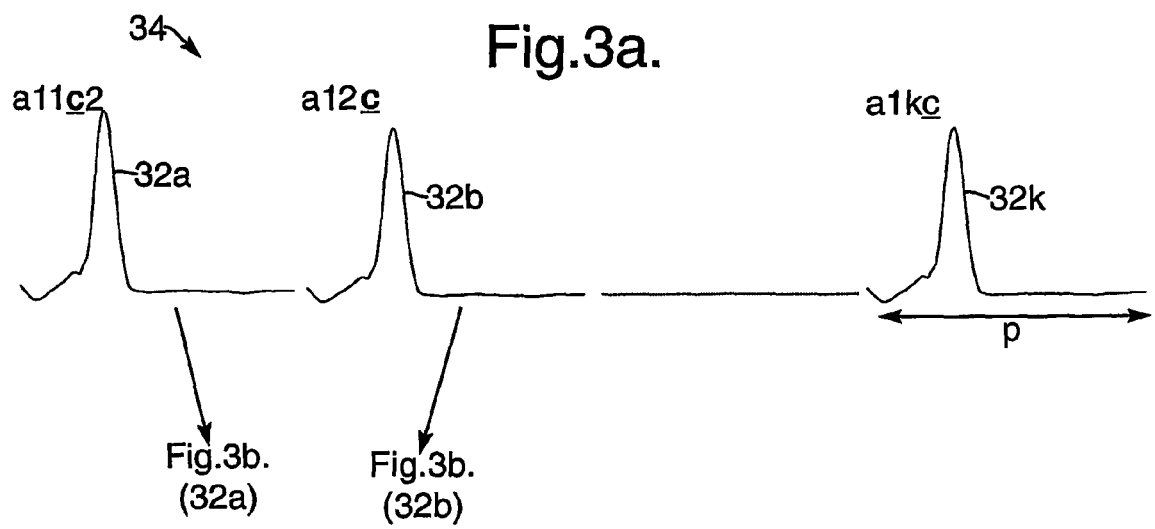
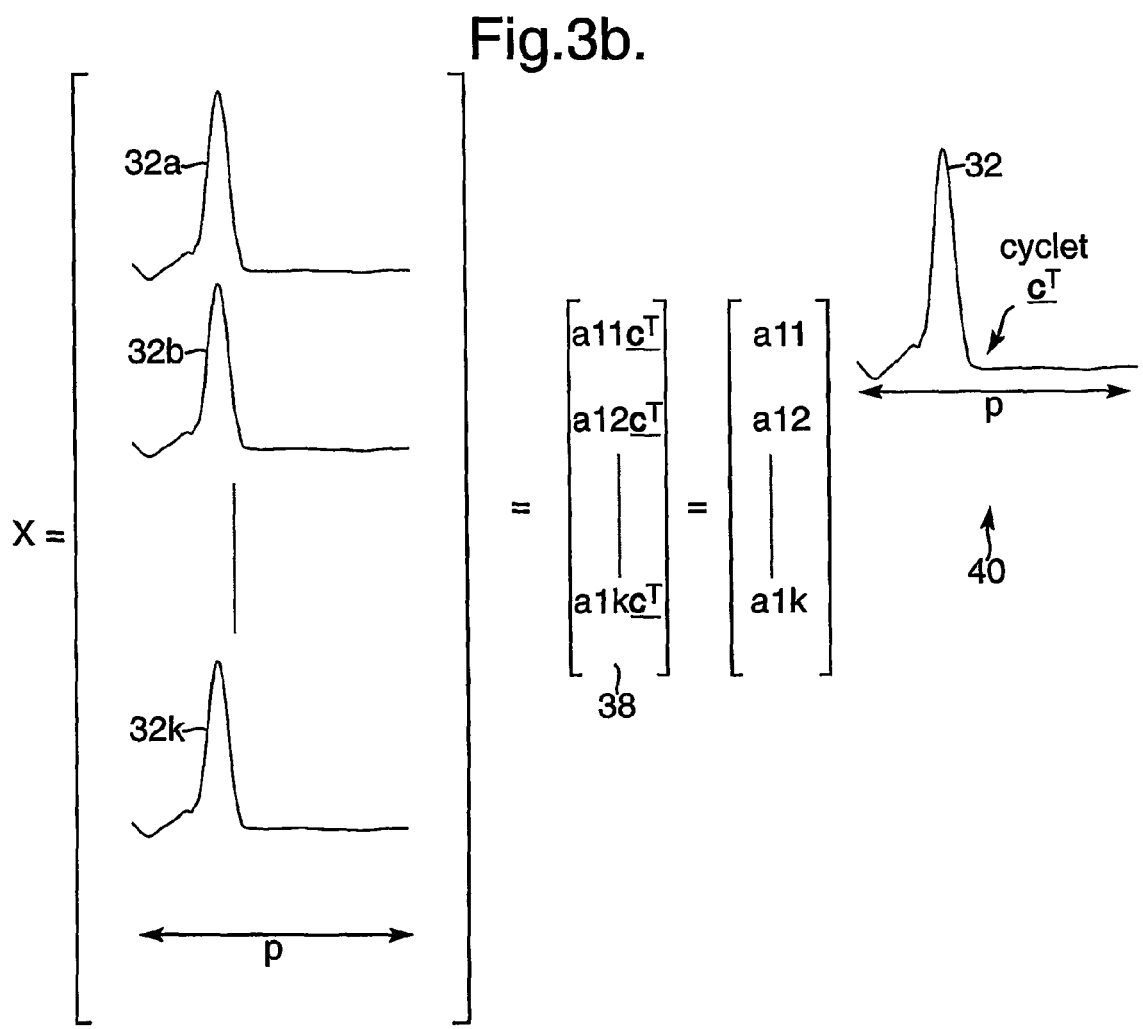

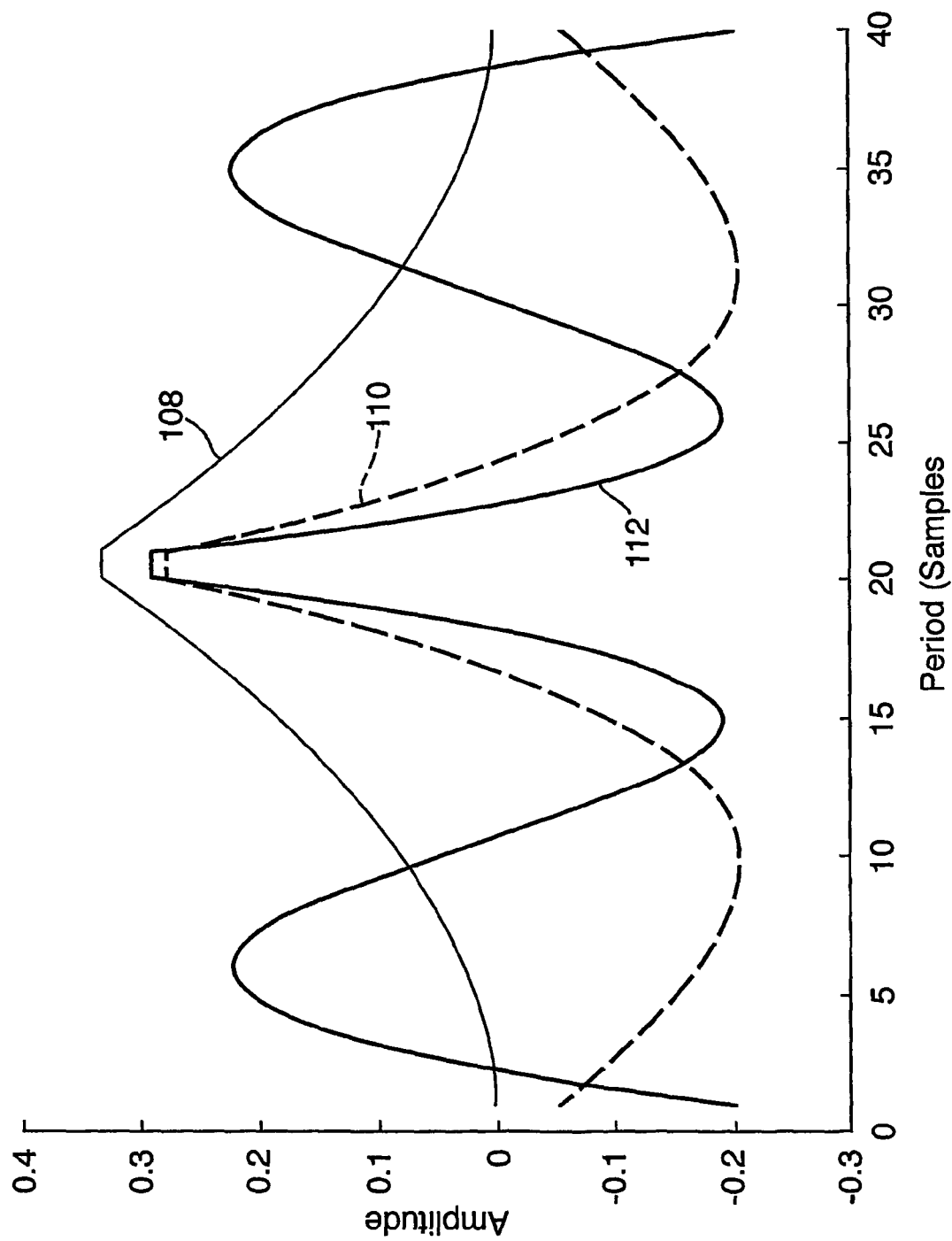

SIGNAL SEPARATION

This invention relates to a method for separation of individual periodic source signals from a composite signal and to computer apparatus and computer software to implement the method.

Signals generated by many real-life sources can be characterised as periodic or almost periodic. Typical examples include: sounds generated by the propellers of ships, mechanical vibrations arising from rotating machinery and electrical signals as a result of a heart-beat. Such signals do not generally occur in isolation: multiple sources generating signals of the same nature (e.g. sound) are often present within the same environment and each will make its own contribution. Individual source signals may be similar or dissimilar in form but, regardless of this, discrimination between signals is likely to require more than straightforward monitoring of a detector response. The detector will respond to a composite signal which contains contributions from each source. In theory, the composite signal should be susceptible to mathematical analysis to retrieve its component parts. There are however many problems encountered in practice.

Prior art analysis of a periodic composite signal is, in the first instance, dependent on estimation of the period of one or more of the signal components. The information that may potentially be available from an analysed signal has motivated the development of many period estimation techniques. The shape (amplitude structure) and period of a signal can provide useful information about its source. Applications have proved numerous: machine condition monitoring, target classification and communications, to name but a few. If each periodic sound in a composite signal generated by rotating machinery can be isolated and ascribed to a particular source, then the operational nature of the sources can be individually monitored. Such monitoring can facilitate early diagnosis of a failing component, which in turn results in reduced downtime and repair costs. Detection and classification of a military target (e.g. a ship or submarine) is possible by analysis of the signals generated by its periodic emitters (e.g. propellers). Periodic modulation schemes are often used in telecommunications, and if multiple signals are transmitted on the same channel then analysis of the composite signal is clearly essential for decoding the individual messages.

For all the above listed applications, it is important to be able to isolate individual periodic signals (which will be referred to herein as component signals) from a composite signal. Each individual signal potentially contains vital information relating to its source.

One technique for separating such signals makes use of multiple sensors to detect the composite signal. Data collected within these multiple channels is then subject to an analysis known as Blind Signal Separation (BSS). This requirement for multiple sensors can be a major disadvantage: for separating n signals, at least n sensors are typically needed. Clearly the practicality of BSS is limited in many cases, with the limitation becoming more severe if a large number of source signals are present.

The goal of BSS methods is the recovery (separation) of a number of statistically independent signals given only sensor observations that are mixtures of the source signals together with noise and unwanted interference. The term "blind" is used to indicate that no prior assumptions are made concerning either the nature of the sources (beyond their statistical independence) or the manner in which their signals are combined. Description of BSS and some of its applications can be found in S. Haykin, "Unsupervised adaptive filtering, Volume 1, Blind Source Separation", John Wiley and Sons, 2000 and A. Hyvarinen, J. Karhunen and E. Oja, "Independent Component Analysis", John Wiley and Sons, 2001. BSS makes use of the spatial characteristics (e.g. arrival direction) of each signal in order to separate component signals.

Given the practical limitations of providing multiple, separated sensors, techniques have also been developed for separating a composite signal detected at a single sensor position. Most prior art period estimation methods in fact exploit their potential for single-sensor analysis, making use of techniques like the Fourier transform. This is generally applied by the use of comb filters, which are tailored for application to periodic signals.

Period estimation techniques aim, for each individual source signal present, first to provide an estimate of its period and then to extract an approximation to the shape of its base repeating unit. This base unit is the smallest repeating unit within the signal and it will be referred to herein as a "cyclet". If a signal is modulated by an amplitude envelope then the amplitude of each cyclet will vary as it repeats. Such modulations occur, for example, if a communication signal is sent on a carrier wave or if a heart-beat is affected by exercise and each beat has a different strength. If multiple periodic signals are present in the composite data then each individual signal is generally detected, estimated and subtracted in turn, until only noise remains. Most calculations are performed on a digitally sampled signal and hence the period may be measured in terms of the number of sample points that the cyclet spans.

Further examples of modulating amplitudes can be found in: Y. Medan, E. Yair and D. Chazan, "Super Resolution Pitch Determination of Speech Signals", IEEE transactions on Signal Processing, Vol. 39, NO. 1, January 1991 in which periodic components of a speech signal are modelled with a varying scaling; M. Feder, "Parameter Estimation and Extraction of Helicopter Signals observed with a Wide-Band Interference", IEEE transactions on Signal Processing, Vol. 41, NO. 1, January 1993 in which helicopter acoustic signals are modelled with a varying scaling; and P. P. Kanjilal, S. Palit and G. Saha, "Fetal ECG Extraction from Single Channel Maternal ECG using Singular Value Decomposition", IEEE transactions on Biomedical Engineering, Vol. 44, NO. 1, January 1997 in which heart-beat signals are modelled with a varying scaling.

One technique used in the prior art to derive an estimate of the period of a signal is known as synchronous averaging. This technique is based on the concept that period likelihood estimators can be used to measure the "strength" of period correlation for a range of period test values. It therefore requires an initial evaluation of a measure of likelihood for each of many test values of the period. The test value that results in the highest likelihood (or correlation) may be used as an estimate of the true period: however, coherent integration can occur at multiples of the true period in addition to the true period itself. In these cases averaged segments will contain multiple lengths of the cyclets and coherent integration will occur. To avoid problems of identifying a fundamental period at multiples of a true period, the search commences at lower periods. This search method is referred to as the small-to-large method and is described in W. A. Sethares and T. W. Staley, "Periodicity transforms", IEEE transactions on Signal Processing, 47(1), January 1999). There are also other search strategies mentioned in this paper. The signal is then partitioned in the time domain into cyclets of the estimated period and successive partitions averaged to obtain an estimate of their shape. Synchronous averaging is described by M. Feder in the reference cited above.

The comb filter makes use of the principle that a periodic signal can be considered as being made up of basis periodic components at a fundamental frequency and multiples thereof. In the frequency domain, this method is equivalent to multiplying the Fourier transform of a signal with a filter that passes only the fundamental and harmonic frequencies of test periods. An example implementing this method is described by A. de Cheveigne and H. Kawahara in "Multiple period estimation and pitch perception model", Speech Communication, 27, 175-185, 1999.

A third technique that may be used in the estimation process is singular value decomposition (SVD). Period SVD uses the same principle as synchronous averaging in that it first partitions a sampled signal in the time domain in accordance with a number of test periods. Instead of then averaging, an SVD is performed on the partitioned data. Partitioned segments are then combined using a weighted average and, at the correct test period, will integrate coherently. Period SVD has the additional benefit that the modulation envelope (scaling of successive cyclets) of a periodic signal is estimated along with the period. An example of its application is presented in the Kanjilal et al reference, cited above.

Many more examples of detection, estimation and separation of multiple periodic signals detected at a single sensor are found in the prior art. For example, see W. A. Sethares and T. W. Staley, "Periodicity transforms", IEEE transactions on Signal Processing, 47(1), January 1999; V. P. Strokes, H. Lanshammar and A. Thorstensson, "Dominant pattern extraction from 3-D kinematic data", IEEE transactions on Biomedical Engineering, 46(1), January 1999.

Every periodic signal can be considered as being made up of basis Fourier components at a fundamental frequency and at multiples of this fundamental (its harmonics). If periodic signals share common Fourier harmonics, this is termed "overlap" in the frequency domain and signal leakage can occur. At the extreme, most significant overlap occurs if individual source signals within a composite signal have the same period.

All the above-mentioned prior art decomposition techniques suffer from the fundamental problem that their accuracy is markedly decreased if component periodic signals overlap in the frequency domain. This arises because they are all based on using the signals periods as the primary discriminant. For example, when using a comb filter, if there is no frequency overlap then basis Fourier components at the fundamental frequency and harmonics will contain information relating to only one source signal. Combining the fundamental plus harmonics to reconstruct this source is therefore effective regardless of the presence or absence of other (different-frequency) signal components within the data. If overlap is present however then the process is not so clear cut. Very little distinction is available between basis Fourier components of different individual signals (originating from different sources), but which occur at the same position in the frequency domain. The principle of repeatedly subtracting individually detected and estimated signals is no longer valid as each estimated signal will contain components (leakage) from other source signals. Such a scenario arises when the periods of component signals within the composite data are not coprime. The term "coprime" means that the highest common factor between two positive integers (in this case the periods in sample point units) is one. That is, signal leakage will occur when the periods of one or more component source signals are, for example, the same or when one period is a multiple of the other. The problem is discussed by Z. Mouhan, C. Zhenming and R. Unbehauen, "Separation of periodic signals by using an algebraic method", IEEE ISCAS-91, 5 pp 2427-2430, 1991. In this paper the authors highlight the inapplicability of their method to separating signals that are not coprime.

It has to be borne in mind as well that as signals are digitally sampled for analysis, the signals need not be coprime only to the resolution of the sampling frequency for the prior art separation methods to break down. That is, signals of, for example, approximately equal periods, or approximately equal multiples, will also appear indistinguishable.

This fundamental problem is not readily ignored as it is indeed the case that in many real-life situations, two or more component source signals will often occur with the same or similar periods. For example, if different parts of machinery rotate at the same speed then separate source signals will be generated at the rotation frequency. Similarly, if a signal reaches a sensor by multiple routes from its point of origin (multi-path), the overall received signal will be a combination of signals with the same period but having traversed different path lengths. Each path effectively gives rise to one perceived source and the combined signal is difficult to decompose into its individual components. Target classification is complicated in that the combined signal will not correspond to any known or actual signature. This problem is analysed in H. Amindvar and P. P. Moghaddam, "Estimation of propeller shaft rate and vessel classification in a multi-path environments", IEEE Proceedings of Sensor Array and Multi-channel Signal Processing Workshop, pp. 125-128, March 2000. In communications, optimal use of bandwidth is achieved if multiple signals are transmitted on the same carrier frequency. Again the problem of separating individual messages with the same period is encountered. It would go some way to providing a complete process for signal analysis if, in the first instance, signals of equal or approximately equal periods received at a single sensor could be separated.

In one attempt to avoid this type of problem a novel method of period estimation for communication signals was proposed by B. Santhanam and P. Maragos in "Harmonic analysis and restoration of separation methods for periodic signal mixtures: algebraic separation versus comb filtering", Signal Processing, 69 pp. 81-91, 1998. Their approach exploits prior knowledge of the shapes of the periodic signals. Unfortunately, in most period estimation problems the shapes are unknown and so despite being found to enhance the detection and separation process, this method is of limited applicability.

In summary therefore, when periodic signals significantly overlap in the frequency domain, the performance of existing period estimation techniques is degraded in two ways. Degradation is most severe when the signals have the same period. At a first stage of analysis, the ability to even detect the presence of two signals is limited. If two signals having the same period are mixed, then only one may be detected using period discrimination alone. At a second stage, there is reduced capacity for signal separation. In general, the estimated separated signal will be a linear combination of the actual individual source signals. Current techniques to overcome this problem make use of an alternative discriminant: either arrival direction at multiple sensors or the requirement of some foreknowledge of the shapes of the periodic component of the signals. Both of these techniques have significant disadvantages which prevent them from being universally applicable.

There is a perceived need for a novel signal separation technique that is capable of separating individual source signals from composite data collected at a single sensor even in situations in which two or more source signals have very similar periods.

Accordingly the present invention provides a method of separating a plurality of source signals from a composite signal expressed as a series of values of signal amplitude, each source signal having a respective period similar or equal to p, characterised in that the method incorporates the steps of:
 a) expressing the composite signal as a matrix X having rows each of which is a respective segment of signal amplitude values and corresponds to a length of time associated with a signal cyclet;
 b) implementing a decomposition of the matrix X by decorrelation and normalisation to obtain decomposition results; and
 c) performing independent component analysis (ICA) of the decomposition results to obtain at least one of estimated separated signal modulation envelopes and estimated separated signal cyclets.

The invention provides a technique by which a composite signal detected at a single sensor can be separated into individual component source signals. This therefore avoids the requirement for multiple sensors and, unlike prior art signal separation techniques, is specifically able to separate signals with the same period from the composite.

The decomposition of the matrix X is preferably a singular value decomposition (SVD) generating decomposition results comprising two singular vector matrices and a singular value matrix, and the step of performing ICA is preferably carried out using one of the singular vector matrices to obtain at least one of an independent component matrix and an associated component matrix one of which matrices contains estimated separated signal modulation envelopes and the other contains estimated separated cyclets.

Source signal period may be determined by trialling a number of possible periods p', steps (a) and (b) being carried out for each possible period p' to derive and decompose a respective matrix $X_{test}$, each matrix $X_{test}$ having a probability associated with its decomposition results, and step (c) being carried out with decomposition results of that matrix $X_{test}$ having maximum probability and taken to be the matrix X. If coherent integration occurs at multiples of a period, a search may commence at lower periods using the small-to-large method described in the W. A. Sethares reference mentioned previously. This method makes use of period SVD in an entirely novel signal separation problem. It provides the advantage of robustness to negative amplitudes in estimating a period within a composite signal, something that is not achieved by alternative prior art period estimation techniques.

Alternatively, the period p may be estimated by synchronous averaging of the composite signal. Although this method is not as robust as period SVD, it is more computationally efficient.

The signal modulation envelopes may be more statistically independent than the cyclets, and if so step (c) is performed on a singular vector matrix U to obtain an independent component matrix $UR_2^T$ containing estimated separated signal envelopes and a matrix $R_2\lambda V$ containing estimated separated cyclets. The cyclets may alternatively be more statistically independent than the signal envelopes, and if so step (c) is performed on a singular vector matrix V to obtain an independent component matrix $R_1^T V$ containing estimated separated cyclets and a matrix $U\lambda R_1$ containing estimated separated signal envelopes. These two alternatives allow the method to be adapted to applications in which different aspects of the signals to be separated are statistically independent.

The method of the invention may include an additional step of estimating a number q of source signals with periodicities similar or equal to p present within the composite signal and reducing the decomposition results in accordance with such number prior to performing step (c). This provides the advantage of reducing the computations necessary in carrying out the ICA stage of this invention. The number q of source signals may be estimated from the source signals' origins, or alternatively from a number of elements of a singular value matrix $\lambda$, the elements having values exceeding a threshold value.

The composite signal may be detected by a single sensor. Alternatively, the source signals may be detected by a plurality of sensors each of which provides a respective composite signal from which a respective matrix X is obtained and analysed in steps (a) to (c). As a further alternative, source signals may be detected by a plurality of sensors providing respective composite signals, the matrix X being obtained from the composite signals collectively.

The invention may be a method of apparatus condition monitoring, the source signals being obtained with the aid of at least one sensor from a plurality of apparatus sources, and the at least one of estimated separated signal modulation envelopes and estimated separated signal cyclets being analysed for indications as to the condition of respective apparatus sources.

In an alternative aspect, the present invention provides computer apparatus for separating a plurality of source signals from a composite signal expressed as a series of values of signal amplitude, the source signals having periodicities similar or equal to p, characterised in that the computer apparatus is programmed to:
 a) express the composite signal as a matrix X having rows each of which is a respective segment of signal amplitude values and corresponding to a length of time associated with a signal cyclet;
 b) decompose the matrix X by decorrelation and normalisation to obtain decomposition results; and
 c) perform ICA of the decomposition results to obtain at least one of estimated separated signal modulation envelopes and estimated separated signal cyclets.

In a preferred embodiment of this alternative aspect, the present invention provides computer apparatus arranged to separate a plurality of source signals from a composite signal expressed as a series of values of signal amplitude, the source signals having periodicities similar or equal to p, characterised in that the computer apparatus is programmed to:
 a) partition the composite signal into a plurality of partition matrices X having rows each of which is a respective segment of signal amplitude values and corresponds to a length of time associated with a signal cyclet;
 b) perform an SVD of at least one of the matrices X to obtain two singular vector matrices U, V and a singular value matrix $\lambda$;
 c) estimate a true period p of the source signals from an average of data within rows of the partition matrices X; and
 d) perform an independent component analysis of one of the singular vector matrices U, V generated by SVD from the matrix X partitioned in accordance with the estimated period p and so to obtain an independent component matrix $UR_2^T$, $R_1^T V$ and an associated component matrix $R_2\lambda V$, $U\lambda R_1$ characterised in that one component matrix $UR_2^T$, $U\lambda R_1$ contains estimated separated signal modulation envelopes and the other $R_2\lambda V$, $R_1^T V$ contains estimated separated cyclets.

In a further alternative aspect, the present invention provides a computer-readable medium embodying instructions for execution by a computer processor, the instructions relating to separation of a plurality of source signals from a composite signal (104) expressed as a series of values of signal amplitude, the source signals having periodicities similar or equal to p, characterised in that the computer-readable medium incorporates program code for controlling a computer processor to:

a) express the composite signal as a matrix X having rows each of which is a respective segment of signal amplitude values and corresponds to a length of time associated with a signal cyclet;

b) decompose the matrix X by decorrelation and normalisation to obtain decomposition results; and c) perform ICA of the decomposition results to obtain at least one of estimated separated signal modulation envelopes and estimated separated signal cyclets.

In a preferred embodiment of this further alternative aspect, the present invention provides a computer-readable medium embodying instructions for execution by a computer processor, the instructions relating to separation of a plurality of source signals from a composite signal expressed as a series of values of signal amplitude, the source signals having periodicities similar or equal to p, characterised in that the computer-readable medium incorporates program code for:

a) partitioning the composite signal into sections to provide respective rows of a partition matrix X;

b) performing an SVD of the matrix X to obtain two singular vector matrices U, V and a singular value matrix $\lambda$; and c) performing an ICA of one of the singular vector matrices U, V to obtain an independent component matrix $UR_2^T$, $R_1^T V$ and an associated component matrix $R_2 \lambda V$, $U\lambda R_1$ characterised in that one matrix $UR_2^T$, $U\lambda R_1$ contains estimated separated signal modulation envelopes and the other matrix $R_2 \lambda V$, $R_1^T V$ contains estimated separated cyclets.

Embodiments of the invention will now be described by way of example only and with reference to the accompanying drawings.

FIG. 1 is a schematic illustration of an application of the method of this invention to machine condition monitoring.

FIG. 2a is a schematic representation of a periodic signal.

FIG. 2b is a schematic representation of a periodic signal with varying modulations.

FIG. 3 is a representation of the formation of a mathematical model of a periodic signal with varying modulations.

FIG. 9 is a plot of estimated source cyclets extracted from the data plotted in FIG. 7 by a partial implementation of a method of this invention.

Figure 4A:
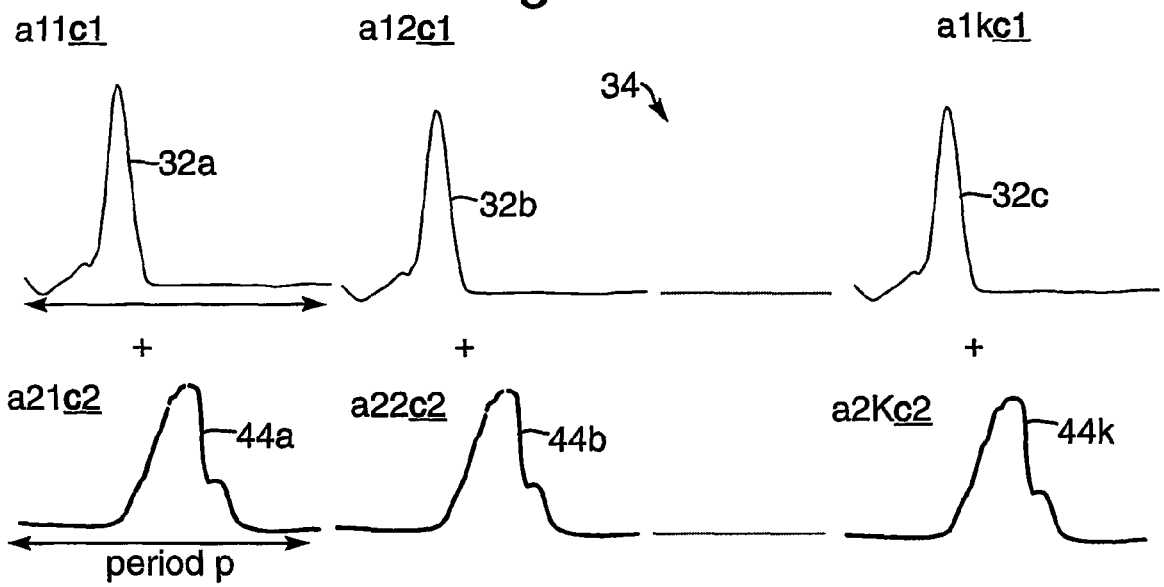
FIG. 4 is a representation of the formation of a mathematical model of multiple periodic signals with varying modulations.

FIG. 1 shows a schematic illustration of the stages involved in a method of machine condition monitoring in accordance with an aspect of this invention. In the arrangement shown in this Figure, signals generated by three sources 10a, 10b, 10c of machinery rotating at the same speed are detected at a sensor 12. In one embodiment, the sensor 12 is a microphone that detects the sound of the rotating machinery 1a, b, c. In another, it is an accelerometer, which detects its vibration. In either case, the detected signal is converted by the sensor 12 (microphone or accelerometer) to an electrical signal. The precise nature of the signals themselves is not important. What is significant is that they originate from multiple sources and are periodic, or near periodic, with potentially more than one signal characterised by a given period. In the scenario shown in FIG. 1 the structure of the recorded signal may be complex. Signals with the same period are present from different machinery components rotating at the same speed.

As shown in FIG. 1, the process of machine condition monitoring can be broken down into four stages. The (composite) output signal from the sensor 12 is recorded and digitised at a data acquisition stage 14. This is followed by a signal separation stage 16 at which the composite signal is decomposed into its component parts. At an analysis stage 18 the individual signal components are analysed, for example for signs that the machinery 10a, 10b, 10c may have developed a fault. There are many existing analysis methods that can be applied to a single source signal to the benefit of machine condition monitoring. Examples are given by N. Arthur, J. Penman, A. McClean and A. Parsons in "Induction machine condition monitoring with higher order spectra 1. Fundamentals and fixed frequency operation", IEEE 24th annual conference of the Industrial Electronics Society pp. 1889-1894, September 1998. Finally, if a fault is detected, corrective action is taken at a fault correcting stage 20. Depending on the fault, the source may be replaced or adjustments made to the machinery in order to reduce the operational stress on the source.

It is to be noted that the first three stages above, namely data acquisition 14, signal separation 16 and data analysis 18, are common to all problems involving multi-source (or composite) signal analysis. The novelty of this present invention lies in the signal separation stage 16 of analysis. The specific problem of machine condition monitoring is therefore used herein for illustrative purposes only and is not in any way to be considered limiting. This invention, in its broadest aspect, as will become apparent, has far wider application to any area of composite signal analysis. This is furthermore not limited to composite signals containing two or more components at the same period; it is in this area however that improvements over the prior art will be most apparent. In other words, the novel technique of this present invention, which is capable of separating signal components of the same period can be applied more generally to a composite signal containing multiple components of the same and different periods. Prior art analysis techniques are first applied to extract the different-period components before application of a second analysis technique to each extracted component in order to separate same-period components hidden within. For clarity only therefore, it is assumed in this embodiment of the invention that different-period components are absent from the composite signal.

Typical structures of periodic signals are illustrated schematically in FIG. 2. In order to provide a mathematical basis for the signal processing carried out by this invention, it is necessary to set up a model for this structure. FIG. 2a is an schematic representation of a perfect periodic signal 26 with period p expressed in units of a sampling interval $\tau$, so p implies $p\tau$. Four repeating units (cyclets) 28a, b, c, d, each extending through one period p are shown. The signal is digitised and so each cyclet 28 can be represented by p sample points, each having a particular amplitude $c_n$, n being a sampling index parameter (sample number). With reference to one cyclet 28a, this can be represented mathematically as a column vector:

$$\underline{c} = \begin{pmatrix} c_1 \\ c_2 \\ c_3 \\ \vdots \\ c_p \end{pmatrix}$$

Or, in shorthand, cyclet 28a can be represented as (p×1) c indicating a (p×1) vector.

A more general quasi periodic signal 30 is represented in FIG. 2b. Again four cyclets 32a, b, c, d are shown, each spanning one period p of the signal 30. This signal 30 however is modulated by a time-varying envelope. As a result each cyclet 32a, b, c, d is scaled by a different amount: a first cyclet 32a by a factor a1, a second 32b by a2, a third 32c by a3, a fourth 32d by a4, and so on. In effect, the modulation envelope can be considered sampled by each cyclet at its peak position. If the modulation envelope is sampled k times within the segment that is analysed, a representation of the complete signal can be generated by consideration of a block of k repeated cyclets. Modulation can be either smoothly-varying (as in amplitude modulation of a carrier wave) or discontinuous, by which it is meant that different and unrelated scaling factors are applied to successive cyclets (as, for example, in a heart-beat). In either case, the modulation envelope of a signal can provide vital information about its source. For example, in the situation described in relation to FIG. 1, if a piece of rotating machinery develops a fault, the fault may cause the machinery to come into contact with other machinery. Friction will increase and so more energy will be emitted by the source. This energy is in the form of an altered modulation envelope to the signal.

FIG. 3 is a representation of how an individual source signal is partitioned for processing by the method of this invention. In FIG. 3a there are shown k cyclets 32a, 32b, ..., 32k (referred to generally as 32), each of period p, and collectively forming a block of cyclets 34 defining a first source signal. The modulation envelope sampled at the peak of each cyclet 32a-k has amplitude a1m, where the "1" index indicates association with the first source signal and the "m" indices (m=1, 2, ... k) indicate respective individual cyclets 32a, 32b, ..., 32k within the block of k cyclets 34.

FIG. 3b illustrates and indicates various forms in which the block of k cyclets 34 can be represented as a matrix X. A graphical representation 36 is shown towards the left hand side. The cyclets 32 each with its respective scaling factor a1m, are partitioned and arranged vertically in a column 36, each cyclet (or strictly speaking the digital values defining it) being a respective row of X. As there are p sample points within each cyclet, and k scaling factors, X is a (k×p) matrix. Although each row of X is a cyclet, it is not essential (but convenient) that each row contain all p sample points of a cyclet. Instead alternate sample points or a more sparse equivalent could be used for a row if it were necessary to reduce the processing burden.

A mathematical representation 38 has the scaling factors written as a column vector, each multiplied by $c^T$, where $c^T$ denotes the transpose of the (p×1) cyclet vector c. If a1 is a (k×1) vector representing the sampled points of the scaling envelope:

$$a1 = \begin{bmatrix} a11 \\ a12 \\ \vdots \\ a1k \end{bmatrix}$$

then, mathematically, for a single source signal:

$$X = a1 \cdot c^T \qquad (1)$$

As an aid to understanding, the (1×p) vector $c^T$ is represented graphically by the cyclet profile 32 in a third representation of X at 40.

In FIG. 4 the representation of FIG. 3 is extended to two periodic signals, which have equal periods p. In FIG. 4a, as before, the first source signal 34 is shown as a block of k cyclets 32a, 32b..., 32k, each of period p, and with amplitude a1m, where "m" (m=1 to k) indexes each of the cyclets 32a-k. A second source signal 42 is also shown as k cyclets 44a, 44b, ..., 44k, each of period p, but with a second profile 44. The modulation of this signal 42 is however different. Sampled at the peak of each cyclet 44a-k the modulation envelope has amplitude a2m, where the "2" index indicates that this is the second source signal and "m" indexes each of the cyclets 44a to 44k.

Figure 4B:
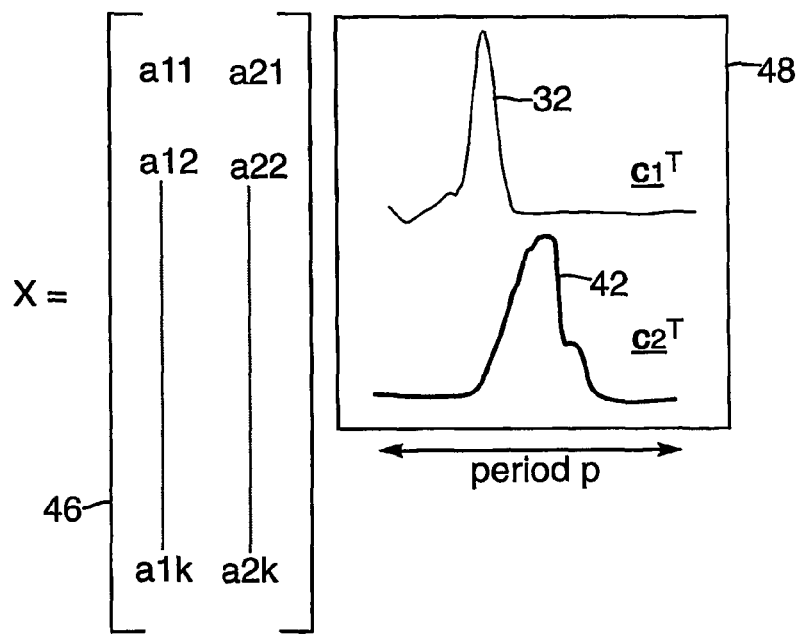

Using the same partitioning model as before, the matrix X is shown in FIG. 4b: it represents a composite signal consisting of a combination of the first 34 and second 42 source signals. Scaling amplitudes aij are now written into a (k×2) matrix 46 and the two cyclet profiles ($c_1$ and $c_2$), one above the other, into a second matrix 48. Mathematically, the matrix X can be expressed as:

$$X = AC = \sum_{i=1}^{2} a_i c_i^T \qquad (2)$$

where $a_i$ is a (k×1) vector which contains the modulation amplitudes (scalings) of the ith cyclet and $c_i^T$ is a (1×p) vector which contains the cyclet profile of the ith periodic signal.

Accordingly, A is a (k×2) matrix containing the envelopes of the two periodic signals in respective columns and C is a (2×p) matrix containing the sampled cyclet profiles of these signals along respective rows.

When signals with the same period are present within a composite signal, their modulation envelopes will combine. The matrix A is therefore known as the mixing matrix as its coefficients operate on the source signals to form the received signal.

Three distinct pieces of information are contained within the matrix X: the size of its rows (i.e. the period p of the source signals), the modulation envelopes (within A) and the cyclet profiles (within C).

Figure 5:
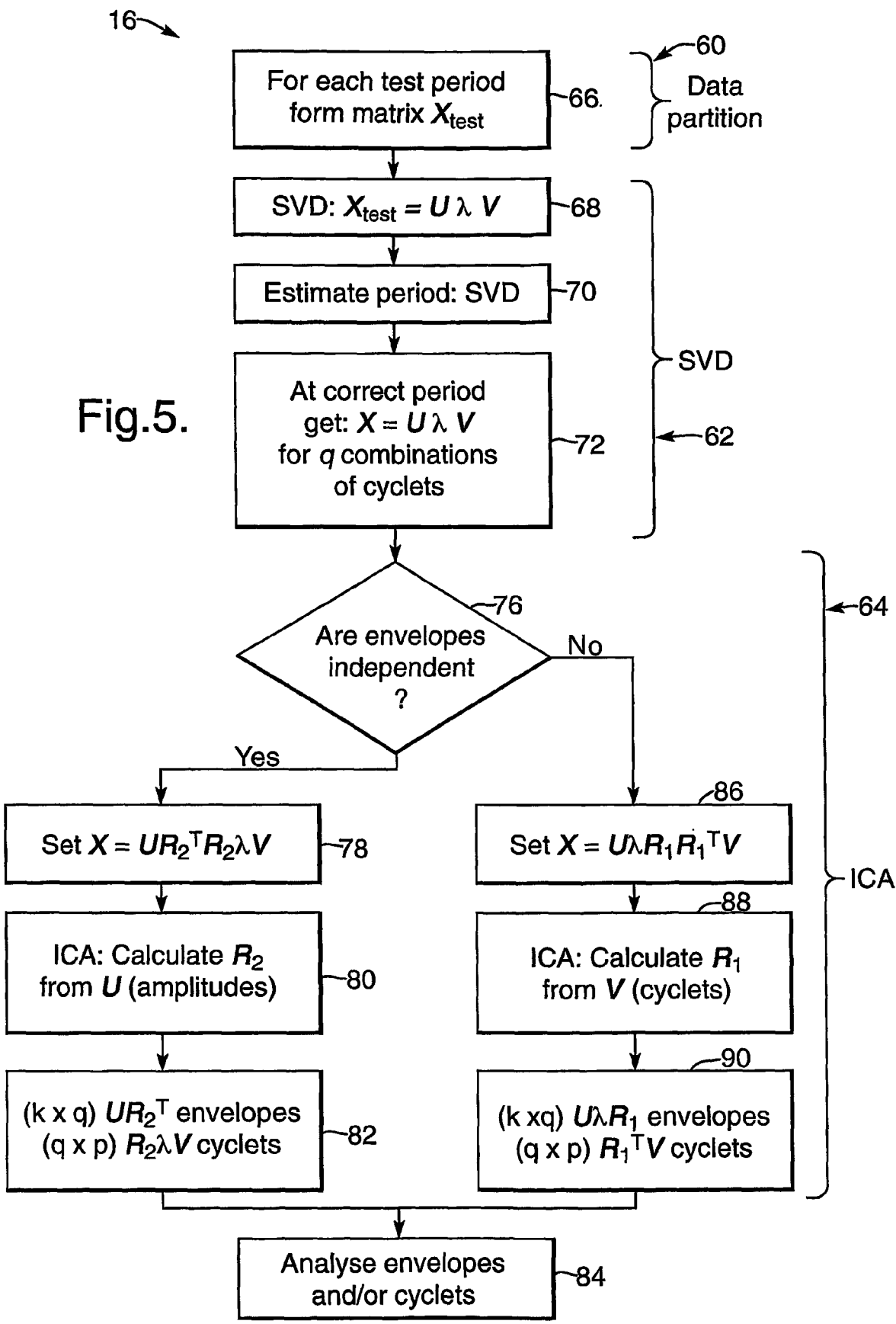
FIG. 5 is a flow chart illustrating the steps involved in implementing a first embodiment of a method of this invention.

FIG. 5 is a flow chart representation of the stages involved in separating signals in accordance with this invention. The separation process 16 will be referred to as the Blind Period Method (BPM). In applying BPM, it is assumed that the periods of the source signals will be constant over the duration of the window used for detection and separation and also that synchronous sampling conditions will apply. That is, the periods will be integer-valued and the sampled points on each successive cyclet will be the same. It is to be noted that sampling rates may be varied to ensure that this latter condition applies. For example, a sample rate at which the period of a signal is measured at 89.25 samples can simply be increased by a factor of 4. This allows the period to be expressed as 357 samples at the new rate.

The BPM essentially divides into three stages: a data partition stage 60, a Singular Value Decomposition (SVD) stage 62 and an Independent Component Analysis (ICA) stage 64. In a first embodiment, period estimation is carried out at the SVD stage 62. In further embodiments a different method is used to carry out the period estimation prior to the SVD stage 62. In these embodiments the SVD stage 62 is only performed on data partitioned in accordance with this estimated period. It is not essential to carry out an SVD: any process of a similar kind carrying out decorrelation and normalisation can be used instead, but SVD is well-known and convenient.

In any embodiment of the analysis in accordance with the present invention, a datastream has been acquired in the form of signal amplitudes at a large number of sample times, of which adjacent pairs of sample times are separated by a constant sample time interval τ as is conventional. It is assumed that multiple sources contribute to the signal but that they have periods which are equal to p or nearly so.

With reference to FIG. 5, in this first embodiment of the analysis method of this invention a first step 66 is, for each one of a set of test periods p', to format the datastream in the form of a matrix $X_{test}$. That is, for each value of the period p', the first p' sampled amplitudes are written across the matrix $X_{test}$ in the first row. The next p' sampled amplitudes are written in the second row and so on until the matrix is complete at row k'.

At step 68, SVD is carried out on the (k'×p') matrix $X_{test}$. SVD is a decorrelation and normalising method and is a well-known analytic technique. The SVD of a general matrix X (assuming rank k) can be expressed as:

$$X = U\lambda V \quad (3)$$

where U is a (k×k) matrix and V is a (k×p) matrix: U and V are orthonormal, i.e columns of U are mutually orthogonal vectors which are normalised, and this also applies to rows of V; λ is a (k×k) diagonal matrix (i.e. all off-diagonal elements are zero) with real elements (singular values) arranged in decreasing order down its diagonal. The columns of U are left orthonormal singular (temporal) vectors and the rows of V are right orthonormal singular vectors.

It is important to understand what is achieved in carrying out an SVD on a matrix formed from the datastream of signal amplitudes. It is helpful in considering this to assume that the matrix X has been derived by correct partition of the datastream in accordance with the true period p of component signals present within. If partitioned in accordance with this period p it is assumed that the datastream fills k rows within matrix X The way in which the SVD of a set of matrices partitioned in accordance with a set of test periods leads to an indication of the true period will be explained later.

In carrying out the SVD of the matrix X, the decomposition essentially obtains U, a matrix of amplitudes and V, a normalised waveform (each is normalised to unit power). In full, assuming rank k:

$$X = \begin{pmatrix} u_{11} & u_{12} & \cdots & \cdots & u_{1k} \\ u_{21} & \ddots & & & \vdots \\ \vdots & & \ddots & & \vdots \\ \vdots & & & \ddots & \vdots \\ u_{k1} & \cdots & \cdots & \cdots & u_{kk} \end{pmatrix} \begin{pmatrix} \sigma_1 & 0 & \cdots & \cdots & 0 \\ 0 & \sigma_2 & & & \vdots \\ \vdots & & \ddots & & \vdots \\ \vdots & & & \ddots & \vdots \\ 0 & 0 & \cdots & \cdots & \sigma_k \end{pmatrix} \begin{pmatrix} v_{11} & v_{12} & \cdots & v_{1p} \\ v_{21} & v_{22} & & \\ \vdots & & \ddots & \\ & & & v_{pp} \\ v_{k1} & \cdots & \cdots & v_{kp} \end{pmatrix} \quad (4)$$

By multiplying out the first pair of matrices (U and λ), it can be seen that the values within the k columns are preserved, with the addition of a multiplicative factor $\sigma_n$, where n is the number of the column. Comparison of this (and equation (3)) with FIG. 4b (and equation (2)) reveals that the columns of U above correspond to the columns of the matrix A in equation (2) and the rows of V above correspond to the rows of the matrix C. That is, information relating to the cyclets ($c_i$) is contained in the rows of V and information relating to the modulation envelopes ($e_i$) is contained in the columns of U. The singular values within λ indicate the strength of their interaction i.e. the strength of the estimated source signals. If the singular values are arranged in decreasing order, later columns in the Uλ matrix will rapidly tend to zero—limiting the number of source signals found. In the event that q of the singular values are non-zero (q≦k), or can be considered as being above a threshold value, then U reduces to a (k×q) matrix, V denotes a (q×p) matrix and λ denotes a (q×q) matrix. If q=2, the comparison with FIG. 4b is evident.

Returning then to step 68 shown in FIG. 5, it can be seen that, for each test period p', performing SVD on the resulting matrix $X_{test}$ obtains sets of matrices U, V and λ. Within the matrices V, each row comprises a weighted average of the relevant segment. At step 70 the rows within each matrix V are added together. At the correct test period p'=p, integration will be coherent, as the summation will inevitably include repeated cyclet profiles. If the test period is not equal to the true period, non-coherent integration results in a significantly lower average value. In this way a likelihood estimator or probability is obtained for each value of the test period. The search commences at a low test period and increments systematically. Peaks will occur in a plot (referred to as a period likelihood estimate) of test period against segment average intensity when coherent integration occurs. That is, when the test period is equal to, or a multiple of, the true period. An estimate of the true period p is therefore obtained at this step 70. As a final step 72 of this period SVD stage 66, the decomposed matrices U, V and X that correspond to the matrix X partitioned in accordance with the true test period are extracted in preparation for the ICA stage 64 of the BPM.

It is not known in the prior art to apply SVD to the problem of separating signals with the same periods from a single-sensor datastream. In fact, it is only known that SVD may be applied to extract component signal periods from a composite signal. This feature is taught by the period SVD method of Kanjilal et al., whose method is directed at signal separation when the periods may be coprime. The above-described partition 60 and SVD 62 stages essentially follow this period SVD method but with the crucial difference that it is applied to data in which at least two component signals have the same period. This present invention is based on the realisation that if a single-channel datastream, representing values collected in the time domain, is partitioned in the manner described herein to form a matrix such as X, then the formerly unsolvable problem of separating signals of the same period collected in a single channel becomes solvable. Mathematically, it is in fact analogous to a problem that has been solved in the spatial domain, although far less intuitive to set up. That is, detecting a composite signal simultaneously at a number of detectors is more naturally written in matrix format, each row of the matrix corresponding to sampled composite signal values in a particular detector channel. For example, if two signals arrive at multiple sensors (at the same time) then the mixing model may be expressed as a combination of two amplitudes (scalings at each sensor) multiplied by the two signal components:

$$X = MS = \sum_{i=1}^{2} m_i s_i^T$$

where the vector $m_i$ denotes the scalings of the ith signal at each sensor and $s_i^T$ denotes the shape of the ith signal. It is known that this problem (i.e. extracting M and S from a matrix X formed from multi-channel datastreams) can be solved in the spatial domain by application of SVD and ICA (by BSS). It is not known that an analogous problem exists and can be solved in the time domain. The solution in a time domain is the subject of this invention.

As mentioned previously, it is known in the prior art that a SVD of the matrix X will not generally reproduce true signals in the spatial domain. Similarly it does not, in itself, reproduce true signals in the time domain. This can be seen by reference to the example to be described with reference to FIGS. 6 to 12. Data within these examples has been simulated. It is representative of the situation illustrated in FIG. 1, but is also generic to any application in which signals of the same period are mixed.

Figure 6:
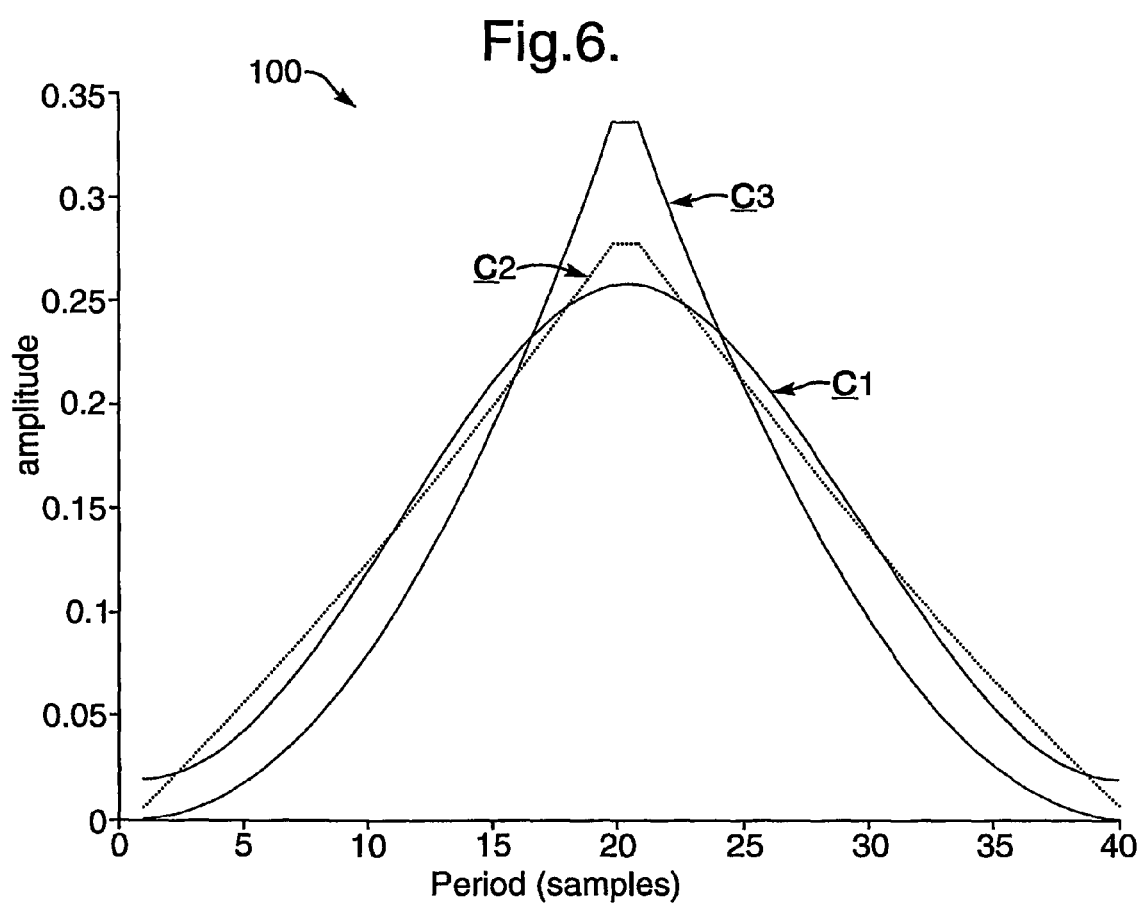
FIG. 6 is a representation of source cyclets used to generate data for an example implementation of a method of this invention.

FIG. 6 is a plot 100 of three source cyclets $c_1$, $c_2$, $c_3$, each of which belongs to a different periodic signal. The cyclets $c_1$, $c_2$, $c_3$ have the same period (40 sample points) and, although different, are highly correlated, as evidenced by their similar shapes.

Figure 7A:
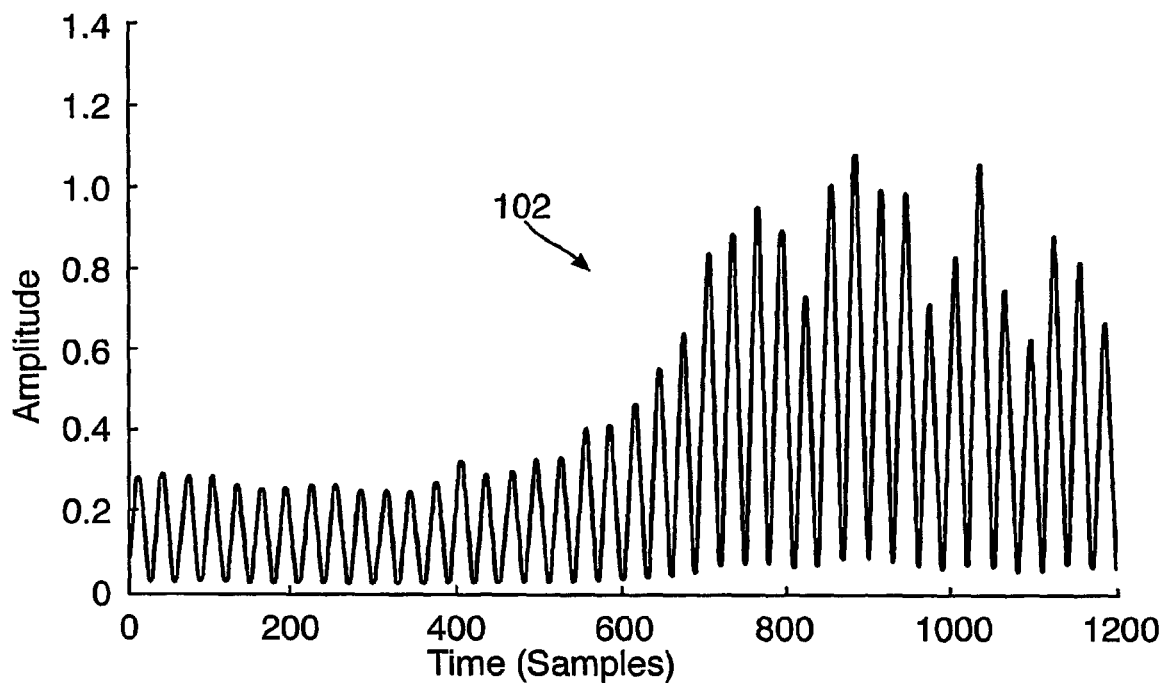
FIG. 7a is a graphical plot of a single periodic signal with varying modulations.

FIG. 7a is a plot of a section of a signal 102 based on one of the source cyclets $c_1$. Over a length of time the cyclet $c_1$ is replicated a number of times, with scaling in accordance with a signal modulation envelope. In this example, the modulation envelope corresponds to a real acoustic signal. The plot is generated by concatenating rows of the (k×40) matrix $X=[a_1][c_1^T]$, the modulation envelope being contained in the (k×1) vector $a_1$ and the cyclet profile in the (1×40) vector $c_1^T$.

Figure 7B:
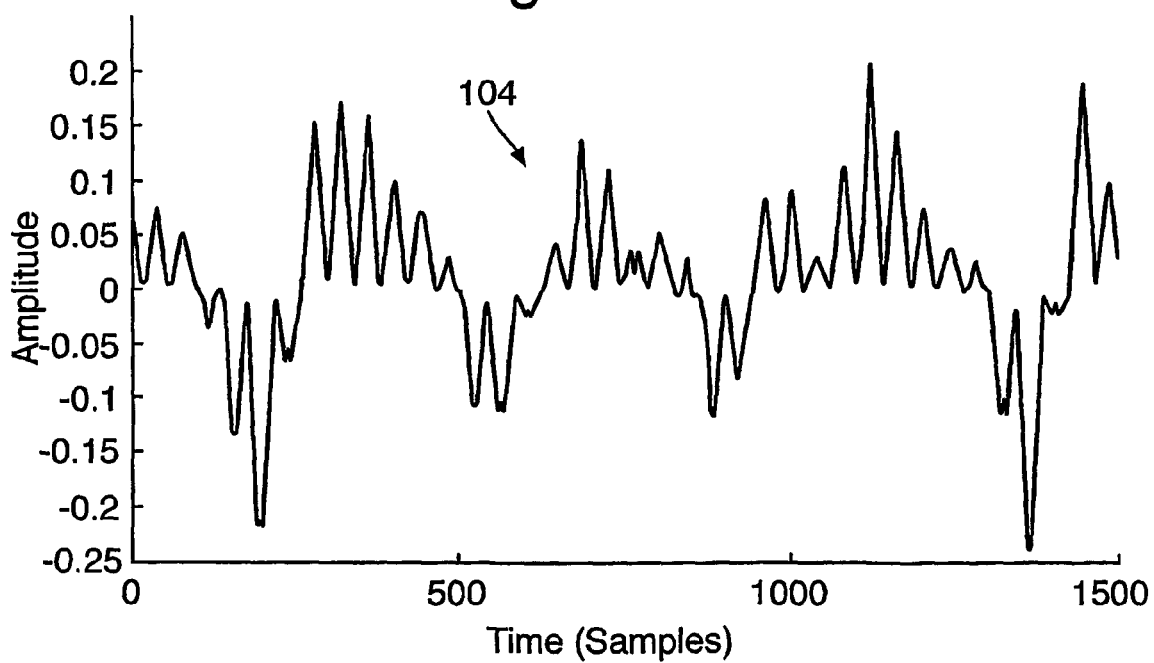
FIG. 7b is a graphical plot of a composite signal containing three periodic signals with varying modulations, each of the same period and generated from the cyclets illustrated in FIG. 6.

A segment of a composite signal 104 generated by mixing three signals, each based on one of the source cyclets $c_1$, $c_2$, $c_3$ is plotted in FIG. 7b. Within the time series shown, each cyclet $c_1$, $c_2$, $c_3$ is replicated a number of times and source signals 102 are each modulated by a different envelope, which corresponds to a real acoustic signal such as speech or music. The composite signal 104 is generated by concatenating the rows of the (k×40) matrix X:

$$X[a_1 \ a_2 \ a_3]\begin{bmatrix} c_1^T \\ c_2^T \\ c_3^T \end{bmatrix} \quad (5)$$

The (k×1) vectors $a_1$, $a_2$, $a_3$ contain the actual acoustic signals (speech and music) and the (40×1) vectors $c_1$, $c_2$, $c_3$ contain the cyclet profiles.

Figure 8:
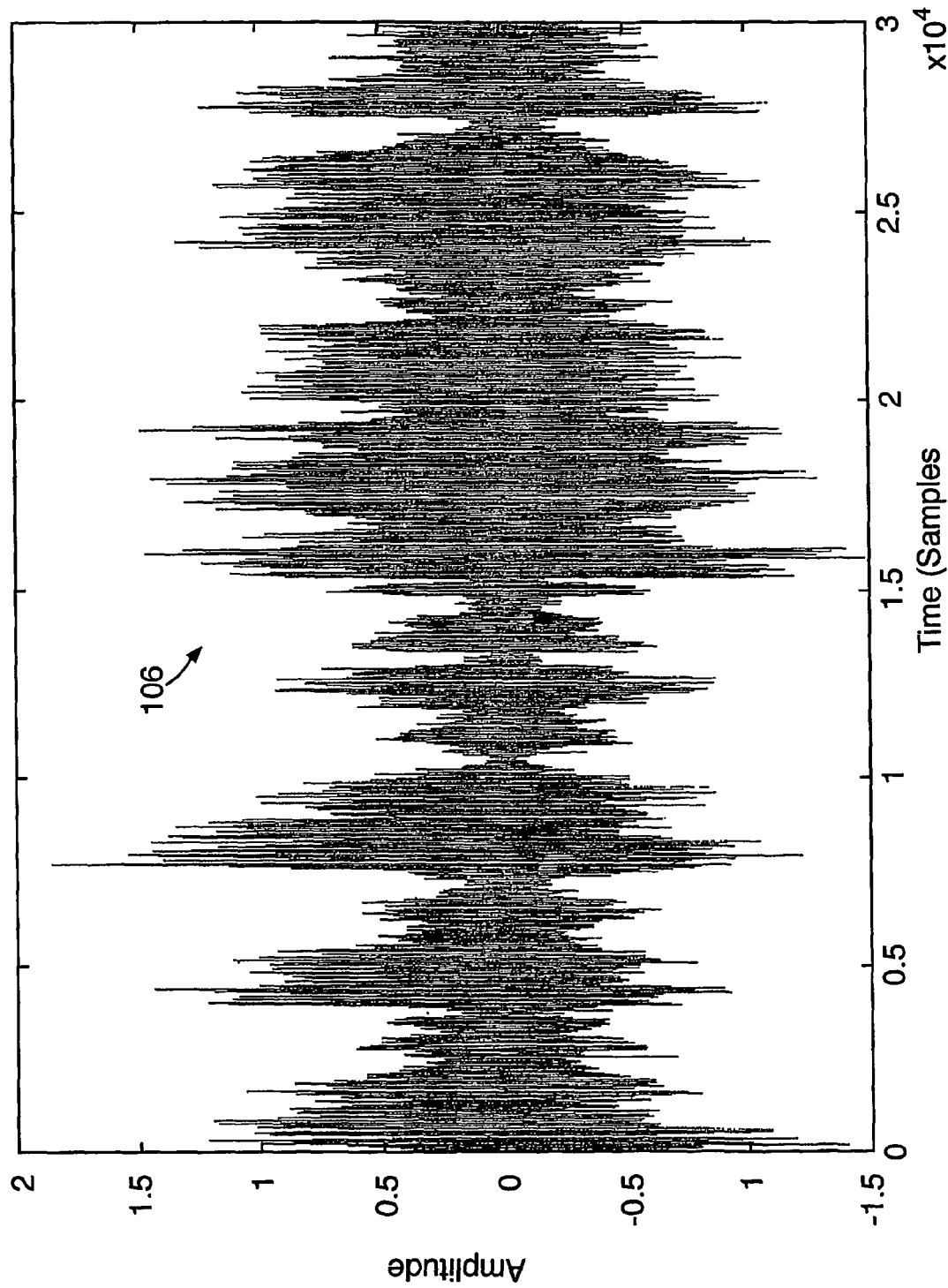
FIG. 8 is a plot of the combination of the envelopes of the three periodic signals plotted in FIG. 7.

FIG. 8 is a plot of a composite acoustic signal 106, representing the mixing of the three envelopes. A single column of the composite matrix X represents a series of sample points taken on the composite envelope at the same position on the cyclet. The composite acoustic signal 106 is accordingly generated by plotting values found in a single column of X as a time series.

Figure 10A:
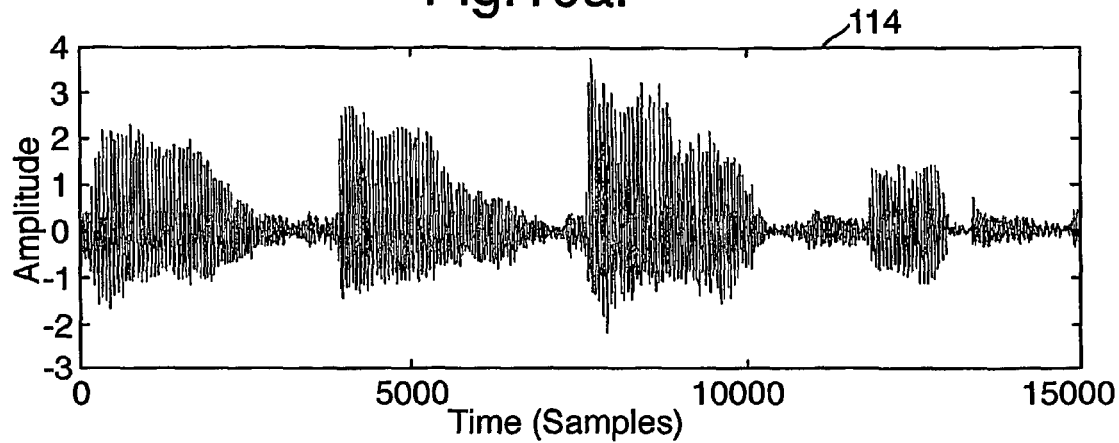
FIG. 10 illustrates plots of estimated amplitude envelopes extracted from the data plotted in FIG. 7 by a partial implementation of a method of this invention.
Figure 10B:
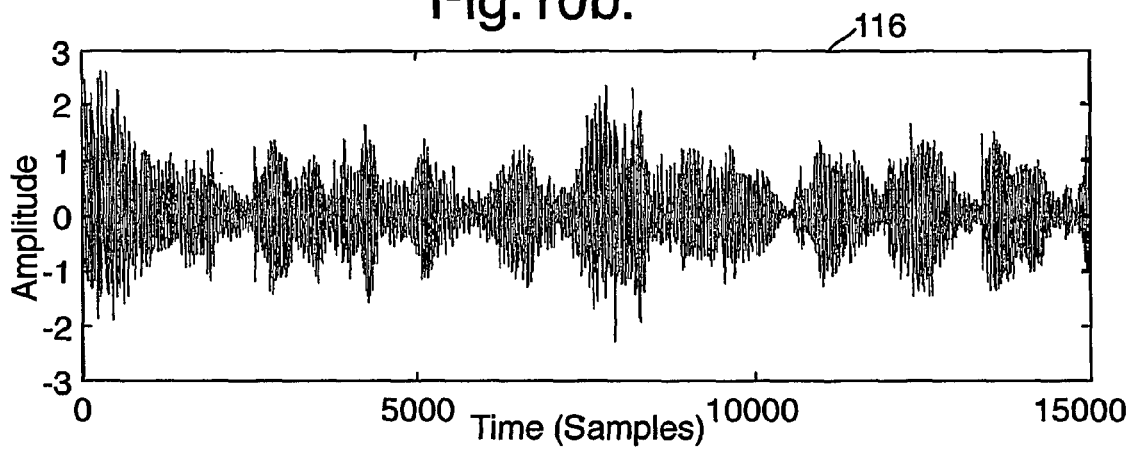
Figure 10C:
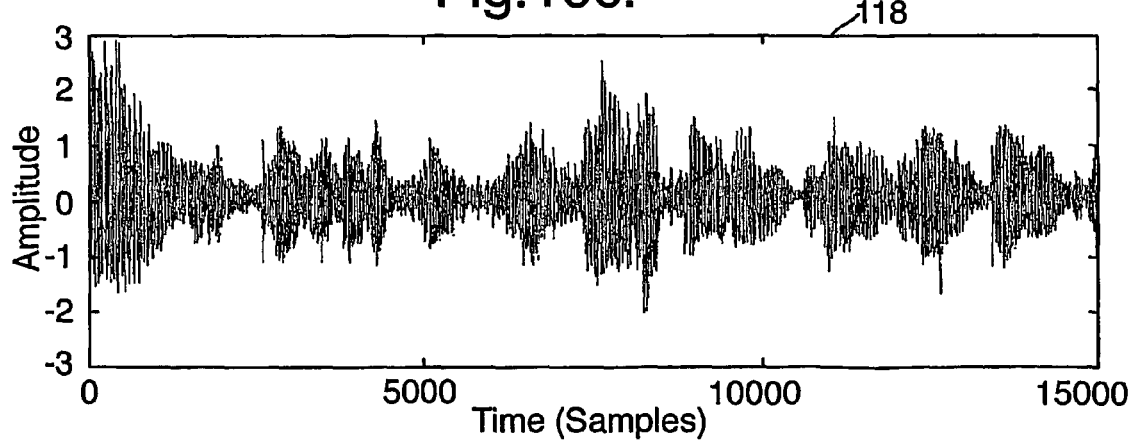

The SVD step 68 of this invention is then applied to the generated matrix X. Estimated cyclet profiles are contained within the rows of the matrix V and these results are shown in FIG. 9. It can be seen that three cyclet profiles 108, 110, 112 are extracted from the decomposed matrix V. Not unexpectedly, as SVD applied in the spatial domain is known to be unsuccessful in separating signals of the same period, these cyclets 108, 110, 112 clearly do not correspond to the original source cyclets $c_1$, $c_2$, $c_3$ shown in FIG. 6. That is, SVD applied in the time domain is also unsuccessful in separating signals of the same period. Modulation envelopes are contained within the columns of the matrix U and these results are shown in FIG. 10. Three modulation envelopes 114, 116, 118 are estimated. From the similarities between two 116, 118 of the envelopes it is apparent that there is a large degree of signal leakage.

The reason for the failure of SVD to separate the signals is that it constrains both the modulation envelopes and cyclet profiles to be uncorrelated, or dissimilar. This is inherent in the SVD methodology as it is a second order decorrelation method, which is intended to remove all similarities between signal pairs in a set of signals. Mathematically, this means that the decomposed vectors are made orthogonal. In many real signals, either the envelopes or cyclet profiles (as in this example) will be similar (correlated) and so a solution that makes them dissimilar will not succeed in separating them. SVD also carries out a normalisation process, which forces normalised signals in the set to have the same power level. Singular values contained in the matrix λ reflect relative power levels and so allows their detection. It is important to note that, although the cyclet profiles are correlated, they do still need to be different for SVD to decompose the matrix X.

SVD does however generally provide some indication of the number of source signals in the composite signal. At step 72, shown in FIG. 5, it will be recalled that relative power levels of the component signals are contained in the singular values and these are generally arranged in decreasing order along the diagonal of the matrix λ. The number of source signals present, denoted by q, can be estimated by setting a threshold power level and determining the number of signals above it. In practical applications threshold estimation may be aided if the number of sources is known in advance.

In summary therefore, period SVD, when applied to the problem of concern to this invention, first enables the correct period of component signals to be determined. Secondly, when the decomposed values of the correctly-partitioned matrix X are retrieved, it enables the singular values to be used to determine whether more than one periodic signal with this period is present in the composite.

Despite the inability of SVD to separate signals of the same period, it has been discovered that SVD does provide an initial basis for their separation. The SVD in fact produces linear combinations of the cyclets $c_1$, $c_2$, $c_3$, whichever combinations comprise orthogonal vectors. The goal of the third stage 64 of BPM is therefore to recover the actual cyclets and their envelopes from these combinations.

Referring once again to FIG. 5, the SVD stage 62, extracts the number q of sources and q linear combinations of cyclets from the composite signal. In some applications it is however difficult to set a suitable threshold level, and so it is assumed that all singular values correspond to sources. In such cases therefore either all decomposed signals are passed on to the next stage 64 or an estimated maximum number, for example, 30. To preserve the generality of the method it will be assumed in what follows that q signals are processed in the final stage 64, and $2 \leq q \leq k$.

At the third stage 64, Independent Component Analysis (ICA) is performed on the decomposed U and V matrices. ICA is again an analytical technique that is known from the prior art of BSS. BSS describes a process of extracting individual signals emitted by a number of statistically independent sources from some linear combination received at an array of sensors. At the heart of ICA is its assumption that the combined sources are statistically independent. To date, ICA has almost exclusively been applied to spatial problems: typically the separation of signals from multiple sources received at multiple sensors. A further assumption of ICA is that the signal combination mechanism is linear, instantaneous and time-invariant. If these assumptions hold then the time-domain partitioning described above creates a mixing model that is analogous to the spatial-domain multiple sensor case. This third stage 64 of BPM is based on a novel application of ICA to a time domain problem: a time sequence of data collected at a single sensor. In the prior art, ICA has not been applied to single-sensor period estimation problems.

As ICA is based on an assumption of statistical independence, it is important to analyse a property of the composite signal that, as far as possible, exhibits statistical independence. A first step 76 of the ICA stage 64 of BPM is therefore to determine whether it is the modulation envelope waveforms $a_i$ or cyclet profiles $c_i$ that are statistically independent. In most applications it is envisaged that one skilled in the art of signal analysis will know this in advance. In the case of machine condition monitoring it is most likely that the envelopes are more independent: components of machinery rotating at the same speed are likely to have similar cyclet profiles, but what they connect or interact with (the source of the modulation) will depend on where a particular component is within the assembly. Similarly, if multiple speech signals are carried in a single communications channel, the "acoustic" envelopes are unlikely to be correlated. On the other hand, in sonar applications, for example, in which a sonar pulse is corrupted by a multi-path signal, it is the cyclets that are more likely to be statistically independent. Since sonar can make use of narrow pulses then any time delay is likely to separate a pulse and its multi-path equivalent, which will therefore not overlap in the time domain. That is, the pulses will comprise cyclets with independent shapes in the time domain. Without independent knowledge of the shapes or delays, the signals of period p will appear to be one signal. In addition, the statistics of multi-path environments can change quickly and so only a few cyclet repeats would satisfy the requirement of having equal period for a valid separation.

If it is the envelopes that are statistically independent, BPM then proceeds to step 78. This assumes that the amplitudes, contained within matrix U, are related to the true independent envelopes by means of an unknown rotation $R_2$. Mathematically, X is set at step 78 to:

$$X = U R_2^T R_2 \lambda V \qquad (6)$$

where $R_2$ defines a unitary (q×q) rotation matrix and so $R_2^T R_2 = I$, the identity matrix. It is also assumed that the columns of X are zero-meaned.

Once the matrix X has been formulated as described herein and then decomposed using SVD, at step 80 ICA is used to determine the hidden rotation matrix $R_2$. As is well documented in relation to prior art applications of ICA, if signal combinations are linear, instantaneous and time-invariant, source signals cannot be separated using second order statistics. ICA is therefore based on higher order statistics (HOS), usually represented by cumulants of higher order than 2.

ICA implemented in accordance with this embodiment of the invention is based on fourth order cumulants. Other implementations of ICA may also be used; it is not necessarily limited to fourth order statistics, but should make use of order three or greater. The procedure adopted to calculate $R_2$ from the matrix U is complex mathematically and well known in the prior art. Effectively $R_2$ is computed as an iterative sequence of pairwise rotations. Each rotation is designed to maximise the statistical independence of a given pair of modulation vectors $a_i$ within the matrix U. Statistical independence is measured by the corresponding pairwise contrast function. The procedure adopted by this embodiment of the invention follows that described by J. G. McWhirter, I. J. Clarke and G. Spence in "Multilinear Algebra for Independent Component Analysis" SPIE's 44th Annual Meeting, the International Symposium on Optical Science, Engineering and Instrumentation, Denver, USA 18-23 Jul., 1999, but other ICA algorithms can also be used. As mentioned previously ICA, applied to spatial problems, is well known in the prior art. The specific details of applying ICA to the decomposed matrix X (as described herein) will therefore be obvious to one skilled in the art. The inventive aspect of the present invention lies in the realisation that, despite the prejudices of the prior art, SVD and ICA can be applied to a time domain problem in order to separate signals with the same period.

Once the rotation matrix $R_2$ has been found, BPM computes, at step 82, final estimates of the cyclets $c_i^e$ and modulation envelopes $a_i^e$. For q detected signals, the separated envelopes are contained in columns of a (k×q) matrix $UR_2^T$. The separated cyclet profiles are contained in rows of a (q×p) matrix $R_2 \lambda V$. At step 84, separated envelopes $a_i^e$ and/or cyclets $c_i^e$ are passed to the analysis stage 18.

In situations for which the modulation envelopes are not independent the ICA analysis based on U, as described above, breaks down. This is because the requirement for statistical independence is not met. As with SVD, ICA removes similarities within a dataset. If the modulations therefore are correlated, signals will not be correctly separated. In such cases, separation is still possible however, based on independence of cyclet profiles. Accordingly, if it is the cyclet profiles that are statistically independent, BPM proceeds to step 86, instead of step 78, after the selection step 76. The ICA has to be modified in order that analysis remains based on independent components—in this case the cyclet profiles. At step 86 matrix X is therefore set to:

$$X = U\lambda R_1 R_1^T V \quad (7)$$

where $R_1$ defines a unitary (q×q) rotation matrix and so $R_1 R_1^T = I$, the identity matrix. In this case, it is assumed that the rows of X are zero-meaned.

As it is the cyclet profiles as opposed to the modulation envelopes that are independent, $R_1$ is calculated at step 88 from the matrix V. This calculation is carried out analogously to that described previously: $R_1$ is computed as an iterative sequence of pairwise rotations, each rotation being designed to maximise the statistical independence of a given pair of cyclet vectors $c_i$ within the matrix V.

Once the rotation matrix $R_1$ is found, BPM computes, at step 90, final estimates of the cyclets $c_i^e$ and modulation envelopes $a_i^e$. For q detected signals, the separated envelopes are contained in columns of a (k×q) matrix $U\lambda R_1$. The separated cyclet profiles are contained in rows of a (q×p) matrix $R_1^T V$. The alternative ICA processes then converge again and, at step 84, the separated envelopes $a_i^e$ and/or cyclets $c_i^e$ are passed on to the data analysis stage 18. This stage 18 employs known techniques that are used to extract information about the source of each signal component and to display results to a user.

Figure 11:
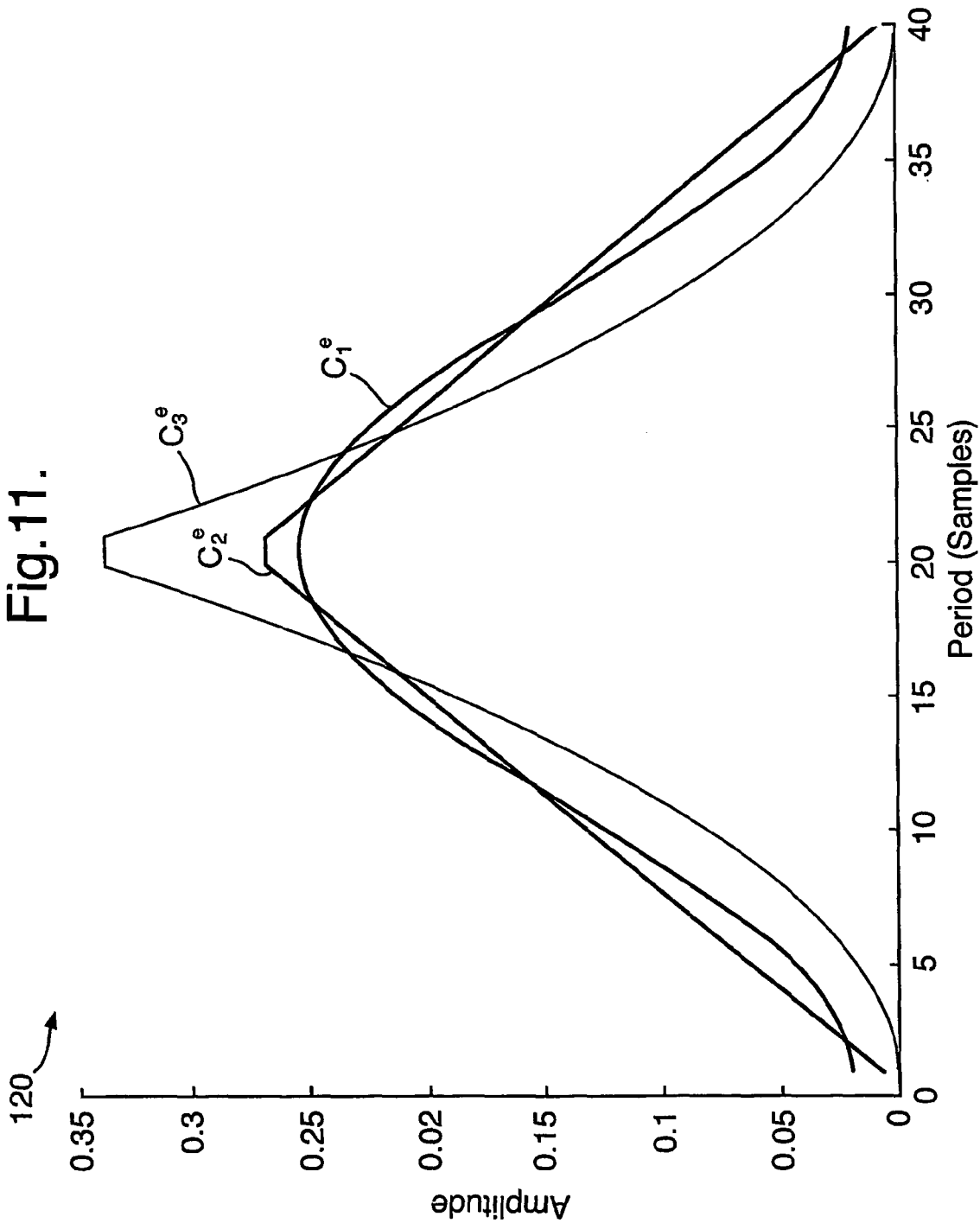
FIG. 11 is a plot of estimated source cyclets extracted from the data plotted in FIG. 7 by a full implementation of a method of this invention.

The full three stages of BPM were applied to the datastream used to generate the plots shown in FIGS. 6 to 12. FIG. 11 displays a plot of three estimated cyclets $c_1^e$, $c_2^e$, $c_3^e$, extracted from the composite signal 104 by BPM (version that exploits the independence of the envelopes). Comparison with the source cyclets $c_1$, $c_2$, $c_3$ of FIG. 6, which were used to generate the composite signals in the first place, readily reveals the success of this method.

Figure 12A:
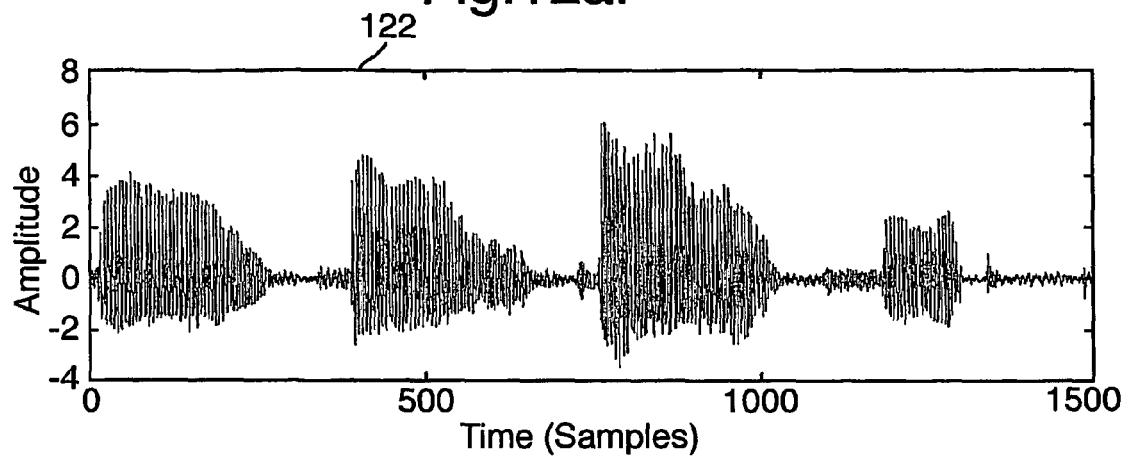
FIG. 12 illustrates plots of estimated amplitude envelopes extracted from the data plotted in FIG. 7 by a full implementation of a method of this invention.
Figure 12B:
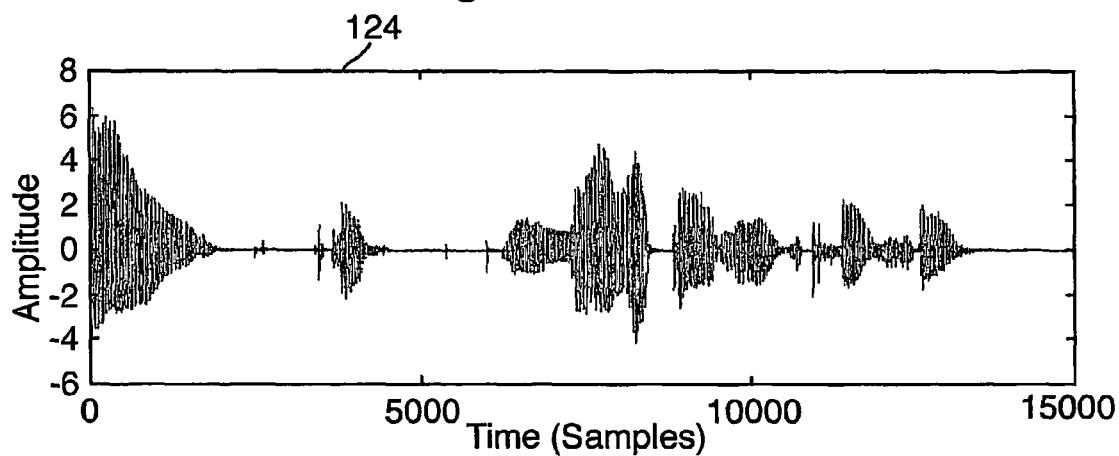
Figure 12C:
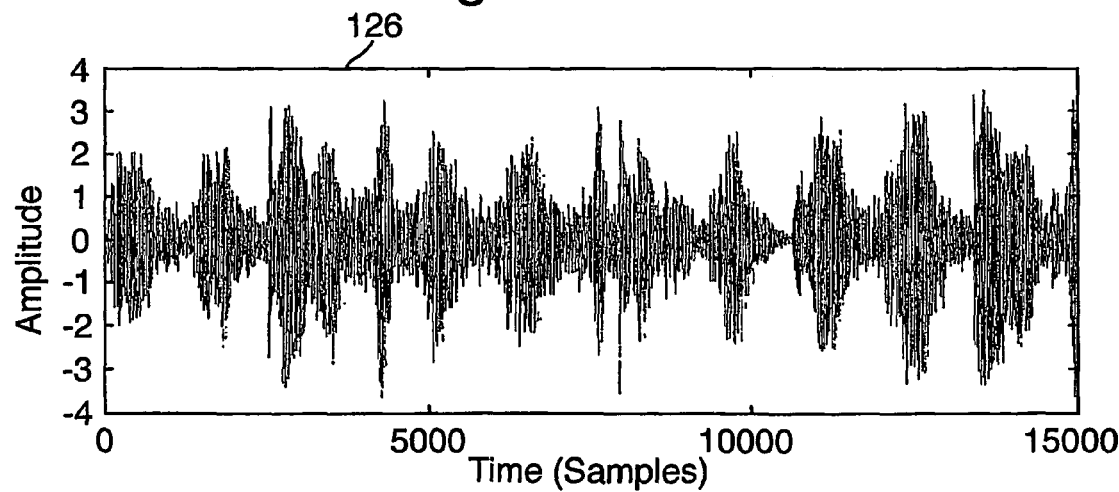
Figure 13A:
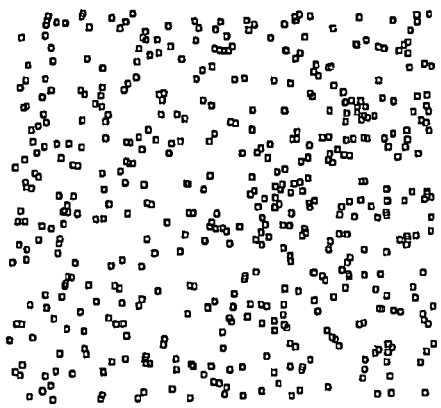
FIG. 13 is a scatter plot illustrating graphically the processes carried out by a method of this invention in separating signals of the same or similar periods.
Figure 13B:
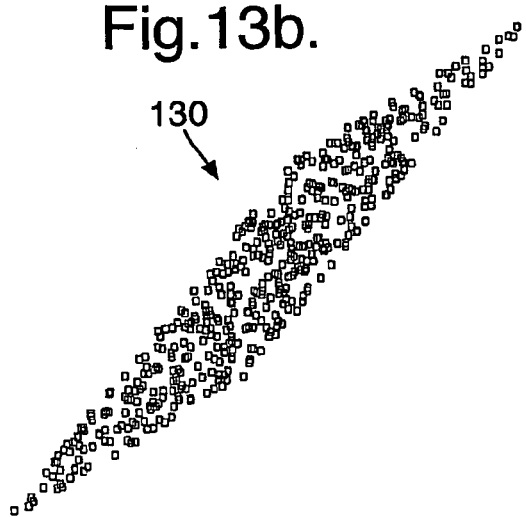
Figure 13C:
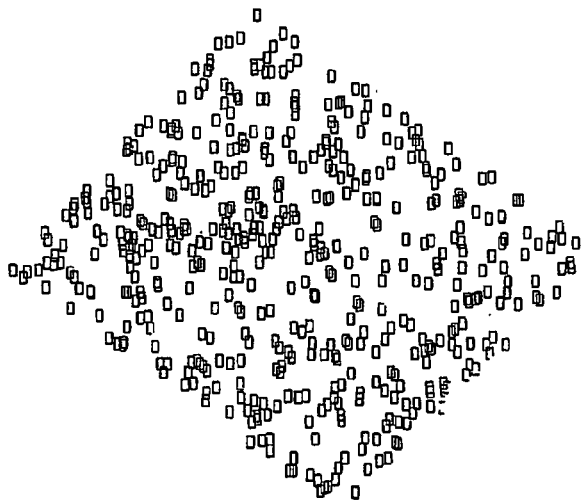
Figure 13D:
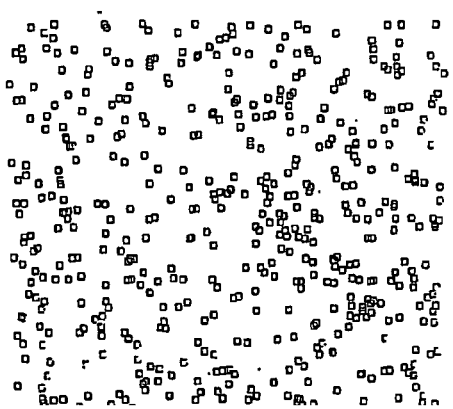

Modulation envelopes are contained within the columns of matrix $UR_2^T$ and the results extracted by BPM are shown in FIG. 12. Three estimated modulation envelopes 122, 124, 126 are recovered. These acoustic signals are readily identifiable as having waveforms characteristic of speech 122, 124 and music 126. In fact the correlation coefficients between the orthonormal source modulations and their respective estimated modulations 122, 124, 126 are all greater than 0.99. The optimum correlation, representing perfect signal separation, is 1.0.

The ICA stage 64 of BPM therefore proceeds by one of two alternative routes. First, if the cyclets are correlated, signal separation (of cyclets and envelopes) is based on the independence of the envelopes. Secondly, if the envelopes are correlated, signal separation is based on the independence of the cyclet profiles. It is important to note that even although the cyclets or envelopes may be correlated, they must still be different for BPM to be effective.

There is an additional advantage to be had in being able to use the independence of the cyclet profiles in the ICA analysis. Typically, to complete the analysis and make signals independent, at least 50 samples are required. If the independence of the envelopes is exploited, each sample used in an envelope vector (element within a column of matrix U) is associated with one cyclet segment (period p samples long). Thus, for an envelope vector to span 50 samples, 50 replications of the cyclet will be required. By way of contrast, if the independence of the cyclets is exploited, signal separation may be achieved using far fewer cyclet repetitions. For q source signals, signal separation can be achieved using q cyclet segments (of period p, assuming that p>~50)

A helpful illustration of the mixing and then decorrelation process is shown in FIG. 13. FIGS. 13*a-d* are each referred to as a scatter plot in which a time-domain signal is sampled and an instantaneous amplitude (envelope) of one source signal is plotted against that of another, at each sample time. Thus if one source has amplitude 3 and the second has amplitude 1 at a particular sampling time, a point is placed on the plot at position (3,1). Over an extended interval, a number of points appear on the graph as the number of sample times increases. FIG. 13*a* is a scatter plot 128 of two random source signals which are not mixed. As can be seen, points are distributed over the area of the plot 128. FIG. 13*b* is a scatter plot 130 of a composite signal when the two source signals shown in FIG. 13*a* are mixed. In this case, data for one axis of the plot is taken from one column of the partitioned matrix X and data for the second axis is taken from another column. That is, the plot 130 shows a first combination of two envelopes, each weighted with one sample of their cyclets, plotted against a second combination of the envelopes. It can be seen that the plot 130 is far from an even distribution. Mathematically, the mixing in fact corresponds to a complicated combination of stretching, shearing and rotation. FIG. 13*c* is a scatter plot 132 of two signals taken from the end of the SVD stage 62, 66 of processing. That is, the corresponding columns of X to those used in FIG. 3*b* are plotted after they have been made orthonormal: after X has been decomposed to a product $U\lambda V$. It can be seen from this plot 132 that SVD removes the stretching and shearing caused by the mixing. FIG. 13*d* shows a scatter plot 134 of the two columns after complete BPM processing. That is, of two columns of the rotated matrix $UR_2^T$. The effect of the hidden rotation matrix found by the ICA stage 64 can be seen to be alignment of the straight edges of the FIG. 3*c* scatter plot 132 with the co-ordinate axes. This representation applies regardless of whether the ICA stage is based on the independence of the cyclets or of the modulation envelopes.

Figure 14:
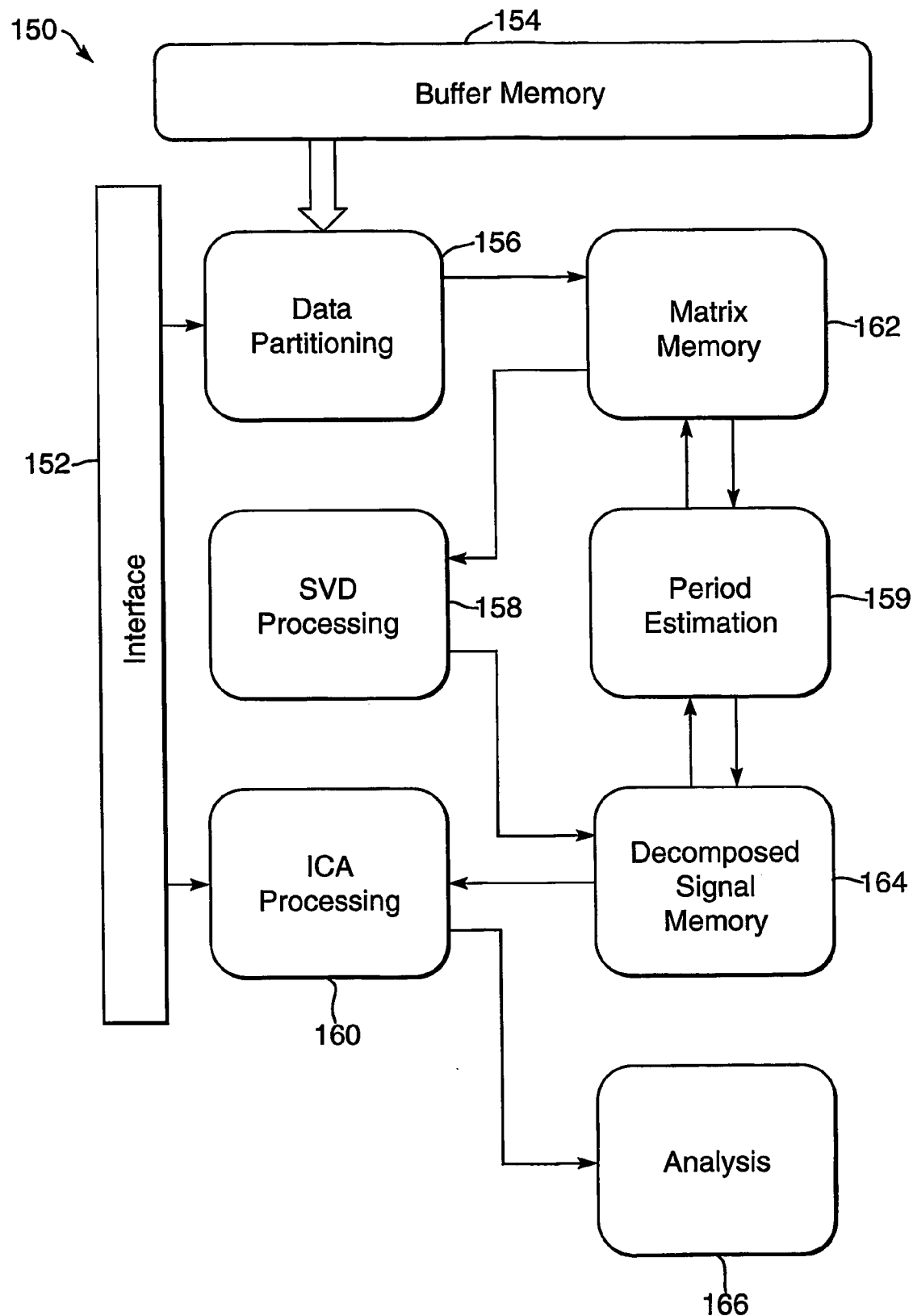
FIG. 14 is a schematic illustration of a computer system arranged to implement another aspect of this invention.

As an aid to summarising the signal separation process, components of a computer 150 arranged to carry out the separation and analysis are illustrated schematically in FIG. 14. The computer 150 comprises an interface 152 to allow a user to select optional processing steps as required, a datastream buffer memory 154 for storing digitally sampled output from the sensor (the composite signal) and four processing modules 156, 158, 159, 160 for performing the BPM separation. This embodiment of the invention acts on a signal with components of only one period p. It can however readily be adapted to perform a prior art period separation process before execution of the procedure described herein. The processing modules include a data partitioning module 156, with access to the datastream memory 154, which is arranged to partition data within the datastream memory 154 in accordance with a set of test periods p'; an SVD processing module 158 arranged to decompose the partitioned datastream into a number of linear combinations of source signals; a period estimation module 159 arranged to extract an estimate of the true period p of the periodic components of the composite signal and an ICA processing module 160 arranged to extract source envelope and cyclet profiles from the decomposed matrices U, V, λ obtained from the matrix X when it is partitioned in accordance with the true period p. In addition, the computer 150 also includes two further memory units: a matrix memory unit 162 and a decomposed signal memory unit 164 for storing data output from the data partitioning module 156 and SVD processing module 158 respectively. In addition an analysis unit 166 is arranged to analyse the data for fault indication or other further processing function.

In carrying out the BPM signal separation process as indicated in FIG. 5, the sensor output in the form of sampled intensities is written to the datastream memory 154. The data partitioning module 156 accesses this data and, for each test period p', partitions the data to form a matrix $X_{test}$. It then writes the data within each segment to a row of the matrix memory unit 162. The, SVD processing module 158 accesses the data stored, as matrix $X_{test}$, in the matrix memory unit 162 and performs a singular value decomposition of this matrix $X_{test}$. Results, in the form of amplitude data, profile data and source strength data are written to the decomposed signal memory 164. For each matrix $X_{test}$, the period estimation module 159 calculates a weighted average of the profiles stored to obtain a likelihood indicator of a particular test period p'. Once the entire set of test periods have been assigned a likelihood indicator, an estimate of the true period is made as that test period which has the maximum likelihood indicator. The decomposed data within the decomposed signal memory 164 that corresponds to that derived from the matrix X partitioned in accordance with the estimated period p is highlighted by the period estimation module 159. The period estimation module 159 in addition accesses the source strength data in the decomposed signal memory 164 and estimates the number of signals that are present at this period p i.e. how many of these highlighted singular values exceed a preset threshold. The components of the decomposed matrices that correspond to the number of estimated sources are also highlighted in the decomposed signal memory 164.

The ICA processing module 160 accesses the highlighted stored amplitude and profile elements for processing. Again either the amplitudes or profiles are processed, in response to a selection made by the user via the interface 152. After the ICA processing is complete, data relating to the separated cyclets and envelopes is sent to the analysis unit 166 for analysis and/or display.

In considering the BPM process described herein, it is apparent that if the period were estimated in advance of the SVD stage 62 (FIG. 5), then only a single SVD need be carried out on a correctly partitioned matrix. That is, we may be able to improve the computational efficiency of the analysis. As mentioned previously, period estimation techniques are well known in the prior art and any of a number of them can alternatively be used. Most of these period estimation techniques are based on the principle of synchronous averaging. A second embodiment (not shown) of this invention accordingly makes use of synchronous averaging.

A synchronous averaging step is performed prior to the SVD stage 62. As in the previous embodiment, the datastream is divided into a number of segments, the size of each segment corresponding to a test period. If the test period is equal to the true period, coherent integration can be achieved simply by averaging the segments. If the test period is, for example, half the true period, alternative segments (period p/2 samples) will contain the same half of the cyclet profile. Thus, averaging these segments will also produce coherent integration, but the combined average of the segments will not be coherent. The test period which gives rise to the highest average value of the segments may be taken as an estimate of the true period p. However, coherent integration also occurs at multiples of the true period, which can affect results: i.e. if the test period is a multiple of the true period, segments will contain an integer number of replicated cyclets and averaging these is effectively equivalent to the averaging process at the true period.

It then follows that to detect a true period, a detection method should be used, such as the "small-to-large" technique described by Sethares et al. (mentioned previously). In this technique, to avoid detecting periods at multiples of the true period, the search is commenced from short to long test periods, hence the term 'small-to-large'.

Thereafter, only the correctly-partitioned matrix X is passed to the SVD stage 62 of analysis. The ICA stage 64 is unchanged and proceeds on the basis of which parameter is statistically independent.

The computer system 150 illustrated in FIG. 14 is in fact capable of analysing the datastream in accordance with either embodiment of the invention. If the user selects period estimation by synchronous averaging, then the period estimation module 159 averages the data stored in the matrix memory 162 rather than in the decomposed signal memory 164. Note that this average is not weighted. Once the period is estimated, on the basis of the maximum likelihood indicator from the set of test periods p', the correctly-partitioned matrix is highlighted within the matrix memory 162. The SVD processing module 158 then performs an SVD of the highlighted matrix X and, as before, writes the output data to the decomposed signal memory 164.

The disadvantage of synchronous averaging is that it cannot be used effectively if negative cyclets are anticipated. Cyclets with negative amplitudes (scalings) often arise in signals propagating through a medium. They are frequently encountered in sonar when multi-path reflections corrupt the original signal. In many other applications, the signal amplitude is measured about a subtracted mean and accordingly negative values result. In such cases, even at the true test period, positive and negative amplitude segments will average destructively. Coherent integration is limited and synchronous averaging may not generate distinctive peaks in the period likelihood estimate. By way of contrast, the period SVD method overcomes this limitation of synchronous averaging as it processes pairs of vectors; relative scalings of each cyclet pair are determined before they are combined. Accordingly the first-described embodiment that makes use of period SVD is preferred.

As detailed above, the main benefit of BPM over prior art methods of signal separation is that it succeeds when applied to data received at only a single sensor. However this is not to say that multiple sensors cannot be used, indeed there is even a benefit to be had in reducing noise. In an implementation in which data is gathered at multiple sensors, BPM is applied in parallel to each datastream. The replicas of the estimated cyclets and/or envelopes obtained from each sensor recording may be averaged in order to suppress noise. For a cyclet repeated k times across m sensors, there are mk degrees of freedom to suppress noise, as opposed to only k degrees in the single sensor case. There are however two distinct separation scenarios which must be considered before the averaging is done.

Figure 15A:
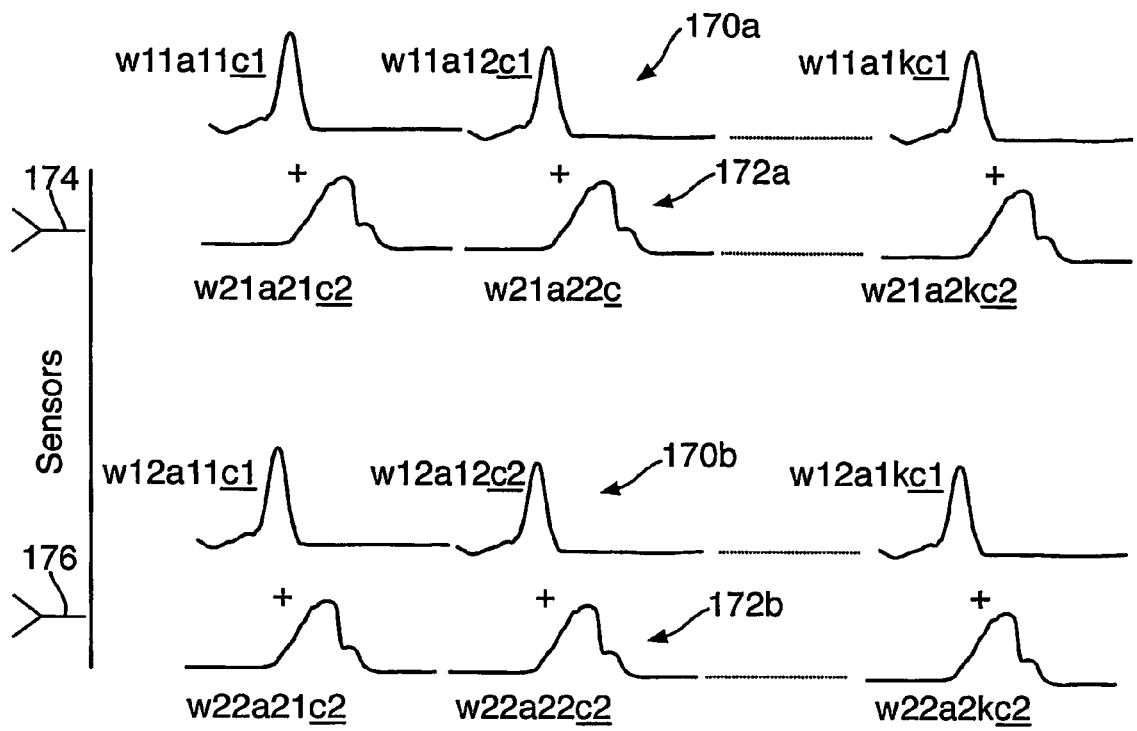
FIG. 15 is a representation of the formation of a mathematical model of multiple periodic signals with varying modulations detected at two sensors.
Figure 15B:
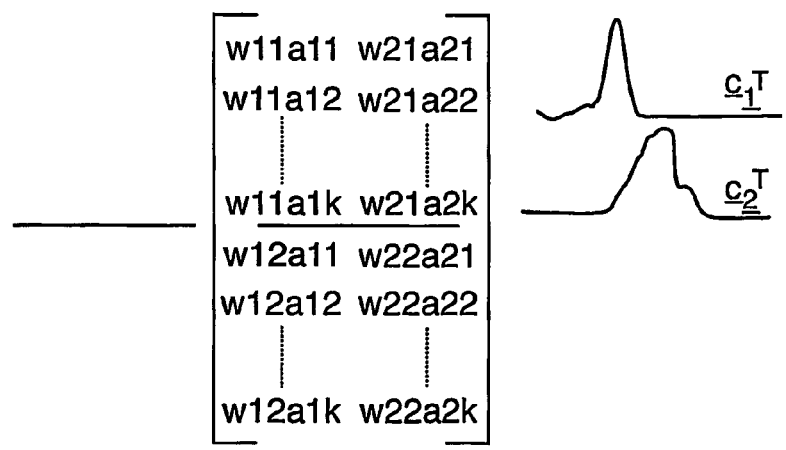

In the first case, referred to as instantaneous mixing, different sensor outputs (channels) can be considered as consisting of replicas of the composite periodic signal but with different additive noise and different attenuations. The latter difference arises from the different propagation paths to spatially separate sensors. This scenario is represented in FIG. 15. In this Figure, two sources (not shown) generate one signal comprising cyclets $c_1$ and modulation amplitudes (a11, a12, ... a1k) and another comprising cyclets $c_2$ and modulation amplitudes (a21, a22, ... a2k). Referring first to FIG. 15a, there is shown the two source signals 170a, 172a arriving at a first sensor 174 and the corresponding source signals 170b, 172b, with different attenuation, arriving at a second sensor 176. The different attenuations can be represented by weighting the amplitudes of each signal 170a,b, 172a,b by a factor wij where i indicates the source of origin and j indicates the sensor of reception. As indicated in FIG. 15b, in this case, segments from both (j=1, 2, in this example) channels can simply be partitioned to form a (2k×p) (more generally (jk×p)) matrix X. BPM can then be carried out as before on the input matrix X.

In the second scenario, the composite periodic signal arrives at different times at different sensors. Different sensor outputs can be considered as consisting of replicas of the periodic signal with different noise, attenuation and also time delays, the latter two both being caused by the different propagation paths to the sensor. Partitioning to use segments from all channels in the input matrix X cannot be exploited in this case. The time delays on different channels will mean that cyclet replicas from different channel recordings would be misaligned within the matrix X. Attempting to separate such a misaligned matrix X has two consequences. First the number of source signals will appear to increase. This arises as a delayed replica of a signal will appear to be distinct from the actual (undelayed) signal. Secondly, since replicas of the same cyclet are misaligned there will be non-coherent integration within the synchronous average step. In this scenario it is therefore necessary to perform two separate BPM analyses: one for each sensor channel. Time delays for each replica can then be obtained using known techniques and a correction applied. Corresponding source signals can then be averaged.

In illustrating the analysis performed by the BPM, it has been assumed that the cyclets within each signal start at the same time. That is, the scaling factors a11, a12, etc and a21, a22, etc occur synchronously between respective signals. If this is not the case and the cyclets in a first signal begin at different times to those in a second signal, the BPM process is still able to separate the signals. As will be explained in more detail below, for each signal that is misaligned with the partitioning process, applying the BPM will result in an estimation of two separated signals. These two signals essentially correspond respectively to sum and difference components of the source scaling factors, with associated cyclets and singular values. In the majority of cases, most of the energy will be in the sum component; the difference component will be associated with a small singular value and can be neglected. Even if this is not the case, the BPM has only linearly decomposed the misaligned source signal and the two estimated (sum and difference) components may readily be associated and combined.

To illustrate in further detail the BPM analysis of misaligned signals, consider first a situation in which two signals with the same period are mixed in a single time series. For this illustrative example, it is assumed that both replicated cyclets have a period of 100 samples but that the cyclet $c_2$ has a different starting time from cyclet $c_1$. If we denote the samples within each cyclet vector $c_i^T$ as $[c_i(0), c_i(1), c_i(2), \ldots c_i(99)]$, the amplitudes aij, as before, and the datastream itself as the (kp×1) vector d, where the symbols k and p have the meanings assigned previously, then if d is partitioned to form the matrix X, we have Equation (8) below:

$$X = \begin{bmatrix} a11[c_1(0), c_1(1), c_1(2), \ldots c_1(99)] + \\ a21[c_2(75), \ldots c_2(99)] a22[c_{22}(0), \ldots c_2(74)] \\ a12[c_1(0), c_1(1), c_1(2), \ldots c_1(99)] + \\ a22[c_2(75), \ldots c_2(99)] a23[c_2(0), \ldots c_2(74)] \\ \vdots \end{bmatrix} \quad (8)$$

where it can be seen that each segment (of the two represented as rows of the matrix X above) comprises the sampled amplitudes within the first cyclet $c_1^T$, starting at t=0 added to synchronously sampled amplitudes within the second cyclet $c_2^T$. The second cyclet is displaced 25 sample points from the first. In this way, in the first segment, sampled points $c_2(75)$ to $c_2(99)$ are weighted by the amplitude a21 and added to the first 25 sampled points of the first cyclet $c_1^T$, whereas sampled points $c_2(0)$ to $c_2(74)$ are weighted by the amplitude a22 and added to the final 75 sampled points of the first cyclet $c_1^T$. This is because the start of this cyclet $c_2^T$ and the partitioning process are offset by 25 samples.

From Equation (8) above it can be seen that each row of X contains a combination of the two cyclets and X can also be expressed as:

$$X = \begin{bmatrix} a11 \\ a12 \\ \vdots \end{bmatrix} [c_1(0), c_1(1), c_2(2), \ldots c_1(99)] + \begin{bmatrix} a21 \\ a22 \\ \vdots \end{bmatrix} [c_2(75), \quad (9)$$

$$\ldots c_2(99), 0, \ldots 0] + \begin{bmatrix} a22 \\ a23 \\ \vdots \end{bmatrix} [0, \ldots, 0, c_2(0), \ldots c_2(74)]$$

where the second component has cyclet vector with 75 samples of zero amplitude and the third component has its first 25 samples of zero amplitude. Thus, the matrix X is effectively made up of three periodic components. The first periodic component consists of cyclet $c_1$ and the remaining periodic components consist of adjacent sections of the cyclet $c_2$. This arrangement arises as a consequence of the starting point of $c_2$ not being aligned with the partitioning process and because modulations are varying. It can be observed that X is effectively a three rank matrix. Neither the amplitudes nor the cyclets of the latter two components (which belong to the same source signal) are independent: separation using BPM should, theoretically, prove difficult.

If however the modulations of the cyclet $c_2$ are slowly varying (i.e. if a21≈a22≈a23) then adjacent segments of $c_2$ can be combined. The partitioned matrix X can be expressed as:

$$X = \begin{bmatrix} a11 \\ a12 \\ \vdots \end{bmatrix} [c_1(0), c_1(1), c_2(2), \ldots c_1(99)] + \quad (10)$$

$$\begin{bmatrix} a22 \\ a23 \\ \vdots \end{bmatrix} [c_2(75), \ldots c_2(99), c_2(0), \ldots c_2(74)]$$

This formulation is similar to that shown in Equation (2) and the BPM can be used to separate the cyclets. Thus, effectively, with slowly varying modulations, the BPM will separate a non-aligned signal into one in which derived weightings are effectively averaged over the two cyclet amplitudes present in one segment.

If, on the other hand, the modulation is highly non-stationary then the non-aligned signal is still separated, although not so straightforwardly, by the BPM. Such a highly non-stationary modulation can however be directly exploited by making use of the BPM version that is based on the independence of the modulation envelopes.

Using the same notation as before, consider a single non-aligned signal with cyclets $c_2$. The partitioned matrix X can be expressed as:

$$X = \begin{bmatrix} a21[c_2(75), \ldots c_2(99)]a22[c_2(0), \ldots c_2(74)] \\ a22[c_2(75), \ldots c_2(99)]a23[c_2(0), \ldots c_2(74)] \\ a23[c_2(75), \ldots c_2(99)]a24[c_2(0), \ldots c_2(74)] \\ \vdots \\ \vdots \end{bmatrix} \quad (11)$$

In this example, X consists of two periodic components: the first example spanning samples 75 to 99 of $c_2$ and the second spanning samples 0 to 74 of $c_2$. The modulations of two components in Equation (11) can be rewritten, by comparison with FIG. 4 and Equation (2), as:

$$A = [a_2, a_3] = \begin{bmatrix} a21 & a22 \\ a22 & a23 \\ a23 & a24 \\ \vdots & \vdots \end{bmatrix} \quad (12)$$

Where A denotes the mixing matrix. One of the modulation vectors $a_3$ is delayed by one sample point with respect to the other modulation vector $a_2$. If the modulations change abruptly then the two columns in Equation (12) will be sufficiently distinct to create two components in the analysed data, albeit that they will belong to the same replicated cyclet. Additionally, it is unlikely that these modulation vectors will be independent of each other. For this example, applying the BPM that is based on the statistical independence of the modulations, a pair of independent temporal modulation (basis) vectors would be generated that belong to the same signal. In order to recreate the time series for a single replicated cyclet, these independent modulation vectors will have to be combined. This is a straightforward task for a single signal. The BPM has simply linearly decomposed the data into a pair of independent temporal modulation vectors. The two signals can be expanded using the corresponding singular values and the corresponding cyclets and simply added together.

If a second signal is present then there is first a need to determine which of the "independent" basis vectors are actually associated and so should be combined to recover the non-aligned signal. Despite this complication, the BPM has in fact achieved signal separation. It is only that two independent basis vectors are created for cyclets with a start that does not coincide with the partitioning process.

One method of identifying and combining the associated base vectors may be appreciated by considering the following analysis. First, define the two separated (k×1) modulation vectors of the same signal as $a_2$=a(k) and $a_3$=a(k+1), where the argument (k+1) simply indicates that this vector is delayed by one sample with respect to a(k). Using a Taylor expansion up to first order for a about k, a(k+1) can be expressed as:

$$a(k+1) \approx a(k) + a'(k) \quad (13)$$

where $a'(k)$ denotes the differential of a(k). The two vectors a(k) and a(k+1) can be more readily expressed as:

$$[a(k)a(k+1)] \approx [a(k)a(k) + a'(k)] \quad (14)$$

$$[a(k)a(k) + a'(k)] \approx [a(k)a'(k)] \begin{bmatrix} 1 & 1 \\ 0 & 1 \end{bmatrix}$$

where each modulation matrix is applied to modulations of the same cyclet. An alternative way to view the (k×2) matrix consisting of a(k) and a(k+1) is the mixing of two components a(k) and $a'(k)$ by a (2×2) matrix. In this case, the BPM will estimate two modulation vectors and these are effectively the sum and difference components, albeit that they will be made independent of each other. Signal association is though made possible by the fact that one modulation vector is effectively the (independent) differential of the other. This should enable their identification in the complete separated signals matrix. It is readily seen that if the modulations are slowly changing then most of the energy will be in the sum component and recombination of the sum and difference components is not required. That is, the situation reduces to the previous one in which an average amplitude was found.

Figure 16A:
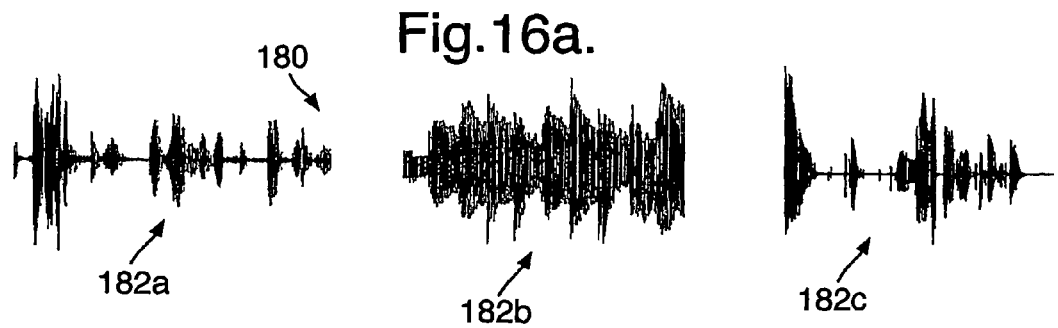
FIG. 16 is a series of four plots that illustrate the ability of a method of this invention to separate signals whose start times are misaligned.
Figure 16B:
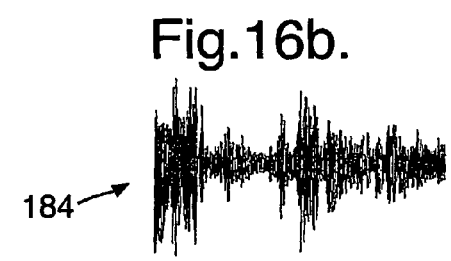
Figure 16C:
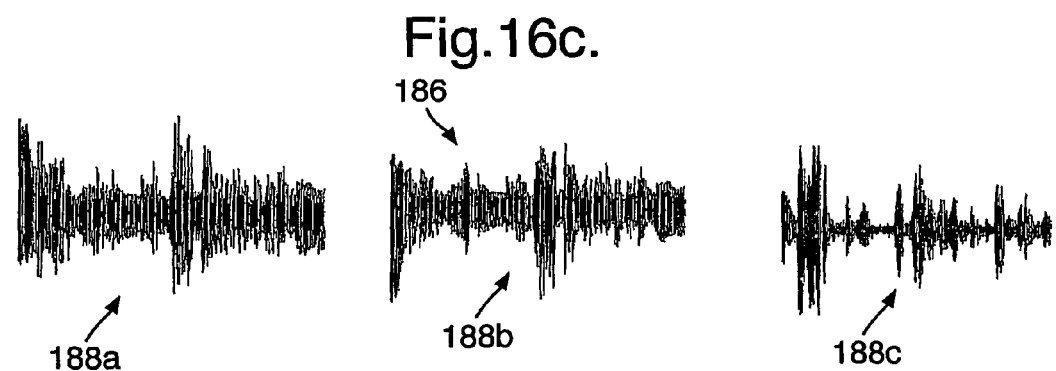
Figure 16D:
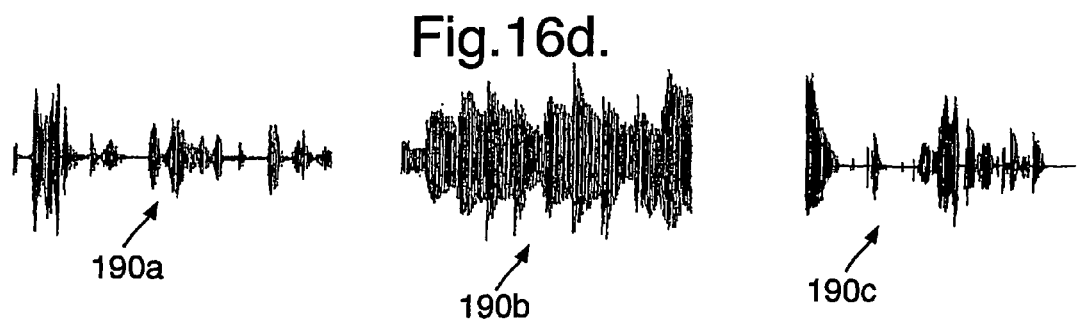

FIGS. 16a) to d) illustrate signal separation by the BPM for a case in which the start times of the replicated cyclets (signals) differ. These plots (FIGS. 16a) to 16d)) are simulated in a comparable way to the data shown in FIGS. 6 to 12. FIG. 16a is a plot 180 of three simulated source modulations 182a, 182b, 182c. These are applied to respective replicated cyclets (not shown), which shall be referred to as $c_1$, $c_2$ and $c_3$. The offsets between the start of a signal cyclet $c_1$, which is aligned with the partitioning process, and the starts of the other signals $c_2$, $c_3$ are 11 and 27 samples respectively. FIG. 16b is a plot 184 of the mixing of the three modulation envelopes. That is, it is generated by plotting values found in a column of matrix X. This is in the same way as the plot 106 shown in FIG. 8 is generated, but using the different modulations 182a, 182b, 182c and offset cyclets $c_1$, $c_2$, $c_3$. After the SVD stage 62 is applied to the simulated matrix X, estimated modulation envelopes, contained within the columns of U, are shown in FIG. 16c. Three modulation envelopes 188a, 188b, 188c are estimated, which it is apparent are not the same as the original source modulations 182a, 182b, 182c. By way of contrast, FIG. 16d) shows modulations 190a, 190b, 190c estimated using the BPM method. As stated above, the BPM estimates, for each of the offset signals, the largest (sum) component only. The modulations 190a, 190b, 190c plotted in FIG. 16d are evidently very similar to the original source modulations 182a, 182b, 182c shown in FIG. 16a. In fact, the correlation coefficients between the orthonormal source modulations and the estimated "sum" modulations were measured at 1, 0.93 and 0.95. It can thus be seen that there is very little error introduced by estimating only the "sum" component of a non-aligned signal in the BPM analysis.

The invention claimed is:

1. A method of separating a plurality of source signals from a composite signal expressed as a series of values of signal amplitude, each source signal having a respective period similar or equal to p, the method comprising using a computer apparatus to perform the steps of:
   (a) expressing the composite signal as a matrix having rows each of which is a respective segment of signal amplitude values and corresponds to a length of time associated with a signal cyclet;
   (b) implementing a decomposition of the matrix by decorrelation and normalisation to obtain decomposition results; and
   (c) performing independent component analysis (ICA) of the decomposition results to obtain at least one of estimated separated signal modulation envelopes and estimated separated signal cyclets.

2. A method according to claim 1 including the step of estimating source signal period p by synchronous averaging of the composite signal.

3. A method according to claim 1 wherein the decomposition is a singular value decomposition generating decomposition results comprising two singular vector matrices and a singular value matrix, and the step of performing ICA uses one of the singular vector matrices to obtain a rotation matrix and calculates at least one of an independent component matrix and an associated component matrix one of which matrices contains estimated separated signal modulation envelopes and the other contains estimated separated cyclets.

4. A method according to claim 3 wherein the signal modulation envelopes are more statistically independent than the cyclets and step (c) includes processing a singular vector matrix of signal amplitudes to obtain a rotation matrix and calculating an independent component matrix containing estimated separated signal envelopes and a matrix containing estimated separated cyclets.

5. A method according to claim 3 wherein the cyclets are more statistically independent than the signal envelopes and step (c) includes processing a singular vector matrix of cyclets to obtain a rotation matrix and calculating an independent component matrix containing estimated separated cyclets and a matrix containing estimated separated signal envelopes.

6. A method according to claim 1 wherein the composite signal is detected by a single sensor.

7. A method according to claim 1 including detecting the source signals using a plurality of sensors each of which provides a respective composite signal from which a respective matrix is obtained and analysed in steps (a) to (c).

8. A method according to claim 1 including detecting the source signals using a plurality of sensors providing respective composite signals, and the matrix is obtained from the composite signals collectively.

9. A method according to claim 1 for apparatus condition monitoring, the source signals being obtained with the aid of at least one sensor from a plurality of apparatus sources, and the at least one of estimated separated signal modulation envelopes and estimated separated signal cyclets being analysed for indications as to the condition of respective apparatus sources.

10. Computer apparatus for separating a plurality of source signals from a composite signal expressed as a series of values of signal amplitude, the source signals having periodicities similar or equal to p, the computer apparatus being programmed to:
 (a) express the composite signal as a matrix having rows each of which is a respective segment of signal amplitude values and corresponding to a length of time associated with a signal cyclet;
 (b) decompose the matrix by decorrelation and normalisation to obtain decomposition results; and
 (c) perform independent component analysis (ICA) of the decomposition results to obtain at least one of estimated separated signal modulation envelopes and estimated separated signal cyclets.

11. Computer apparatus for separating a plurality of source signals from a composite signal expressed as a series of values of signal amplitude, the source signals having periodicities similar or equal to p, and the computer apparatus being programmed to:
 (a) partition the composite signal into a plurality of partition matrices having rows each of which is a respective segment of signal amplitude values and corresponds to a length of time associated with a signal cyclet;
 (b) perform a singular value decomposition (SVD) of at least one of the matrices to obtain two singular vector matrices and a singular value matrix;
 (c) estimate a true period p of the source signals from an average of data within rows of the partition matrices; and
 (d) perform an independent component analysis to obtain a rotation matrix using one of the singular vector matrices generated by SVD from the matrix partitioned in accordance with the estimated period p and to calculate an independent component matrix and an associated component matrix one component matrix containing estimated separated signal modulation envelopes and the other containing estimated separated cyclets.

12. A non-transitory computer-readable medium embodying instructions for execution by computer apparatus, the instructions relating to separation of a plurality of source signals from a composite signal expressed as a series of values of signal amplitude, the source signals having periodicities similar or equal to p, and the computer-readable medium incorporating program code for controlling computer apparatus to:
 (a) express the composite signal as a matrix having rows each of which is a respective segment of signal amplitude values and corresponds to a length of time associated with a signal cyclet;
 (b) decompose the matrix by decorrelation and normalisation to obtain decomposition results; and
 (c) perform ICA of the decomposition results to obtain at least one of estimated separated signal modulation envelopes and estimated separated signal cyclets.

13. A non-transitory computer-readable medium embodying instructions for execution by computer apparatus, the instructions relating to separation of a plurality of source signals from a composite signal expressed as a series of values of signal amplitude, the source signals having periodicities similar or equal to p, the computer-readable medium incorporating program code for controlling computer apparatus to:
 (a) partition the composite signal into sections to provide respective rows of a partition matrix;
 (b) perform a singular value decomposition of the matrix to obtain two singular vector matrices and a singular value matrix; and
 (c) perform an independent component analysis of one of the singular vector matrices to obtain a rotation matrix and using the rotation matrix to calculate an independent component matrix and an associated component matrix , one matrix containing estimated separated signal modulation envelopes and the other matrix containing estimated separated cyclets.

14. A method of separating a plurality of source signals from a composite signal expressed as a series of values of signal amplitude, each source signal having a respective period similar or equal to p, the method comprising using a computer apparatus to perform the steps of:
 (a) expressing the composite signal as a trial matrix having rows each of which is a respective segment of signal amplitude values and corresponds to a length of time associated with a signal cyclet with a trial period p',
 (b) implementing a singular value decomposition of the trial matrix to generate two singular vector matrices and a singular value matrix, the trial matrix having a probability associated with its decomposition; and
 (c) iterating steps (a) and (b) for a series of different values of the trial period p' to generate multiple versions of the trial matrix and associated probabilities;
 (d) performing independent component analysis (ICA) upon results obtained in the singular value decomposition of that version of the trial matrix associated with maximum probability and having signal cyclet of trial period p' taken to be the period p subject to this period not corresponding to a multiple of a true period.

15. A method of separating a plurality of source signals from a composite signal expressed as a series of values of signal amplitude, each source signal having a respective period similar or equal to p, the method comprising using a computer apparatus to perform the steps of:

(a) expressing the composite signal as a matrix having rows each of which is a respective segment of signal amplitude values and corresponds to a length of time associated with a signal cyclet;

(b) implementing a decomposition of the matrix by decorrelation and normalisation to obtain decomposition results;

(c) estimating a number q of source signals with periodicities similar or equal to p present within the composite signal and reducing the decomposition results in accordance with such number; and (d) performing independent component analysis (ICA) of the decomposition results to obtain at least one of estimated separated signal modulation envelopes and estimated separated signal cyclets.

16. A method according to claim 15 characterised in that the number q of source signals is estimated from the source signals' origins.

17. A method according to claim 15 characterised in that the number q of source signals is estimated from a number of elements of a singular value matrix, the elements having values exceeding a threshold value.

* * * * *